(12) United States Patent
Miyachi et al.

(10) Patent No.: US 9,401,671 B2
(45) Date of Patent: Jul. 26, 2016

(54) ELECTRIC POWER CONVERSION CIRCUIT

(71) Applicant: DENSO CORPORATION, Kariya, Aichi-pref. (JP)

(72) Inventors: Jyunji Miyachi, Anjo (JP); Tsuneo Maebara, Nagoya (JP); Yousuke Asako, Anjo (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/300,683

(22) Filed: Jun. 10, 2014

(65) Prior Publication Data

US 2014/0368145 A1    Dec. 18, 2014

(30) Foreign Application Priority Data

Jun. 12, 2013   (JP) ................... 2013-123908

(51) Int. Cl.
| | |
|---|---|
| *H02P 6/14* | (2016.01) |
| *H02P 6/08* | (2016.01) |
| *H02M 7/00* | (2006.01) |
| *H02P 21/06* | (2016.01) |

(52) U.S. Cl.
CPC ............... *H02P 6/08* (2013.01); *H02M 7/003* (2013.01); *H02P 21/06* (2013.01)

(58) Field of Classification Search
CPC .......... H02M 3/00; H02M 3/155; H02K 5/02; H02P 6/08
See application file for complete search history.

(56) References Cited

U.S. PATENT DOCUMENTS

| | | |
|---|---|---|
| 6,181,590 B1 | 1/2001 | Yamane et al. |
| 2010/0061071 A1* | 3/2010 | Watanabe ............ H01F 27/292 361/782 |
| 2013/0294040 A1 | 11/2013 | Fukumasu et al. |

FOREIGN PATENT DOCUMENTS

| | | |
|---|---|---|
| JP | 9-182459 | 7/1997 |
| JP | 2000-350474 | 12/2000 |
| JP | 2009-105178 | 5/2009 |
| JP | 2010-124523 | 6/2010 |
| JP | 2010-183763 | 8/2010 |
| JP | 2012-139016 | 7/2012 |
| JP | 2014-011943 | 1/2014 |

OTHER PUBLICATIONS

Office Action (2 pgs.) dated Apr. 28, 2015 issued in corresponding Japanese Application No. 2013-123908 with an at least partial English-language translation thereof (3 pgs.).

* cited by examiner

*Primary Examiner* — Karen Masih
(74) *Attorney, Agent, or Firm* — Nixon & Vanderhye P.C.

(57) ABSTRACT

In a three phase inverter device, a smoothing capacitor, a bus bar at a positive electrode side and a bus bar at a negative electrode side are formed on a first surface of the circuit substrate. Electronic components containing a microcomputer, etc., a differential wiring pattern, a single wiring pattern and a current wiring pattern are formed on a second surface of the circuit substrate. A ground pattern is formed in the inside of the circuit substrate in order to separate the electronic components, the differential wiring pattern, the single wiring pattern and the current wiring pattern from the smoothing capacitor, the bus bar at the positive electrode side and the bus bar at the negative electrode side.

9 Claims, 18 Drawing Sheets

FIG.9A
FIG.9B
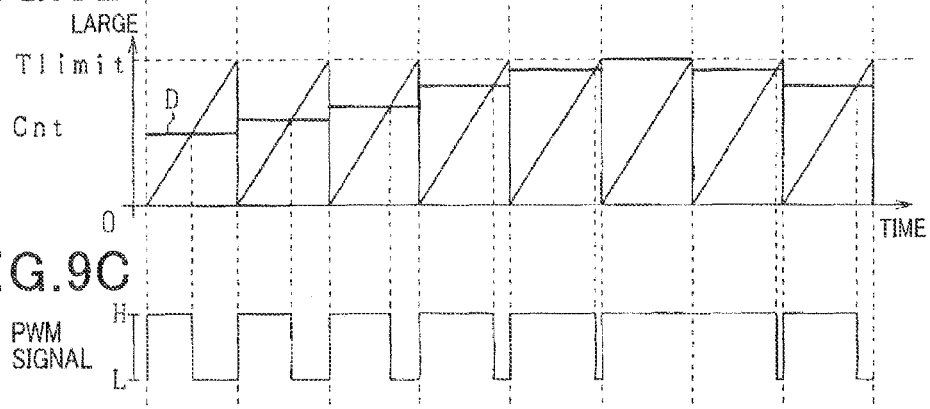
FIG.9C
FIG.10
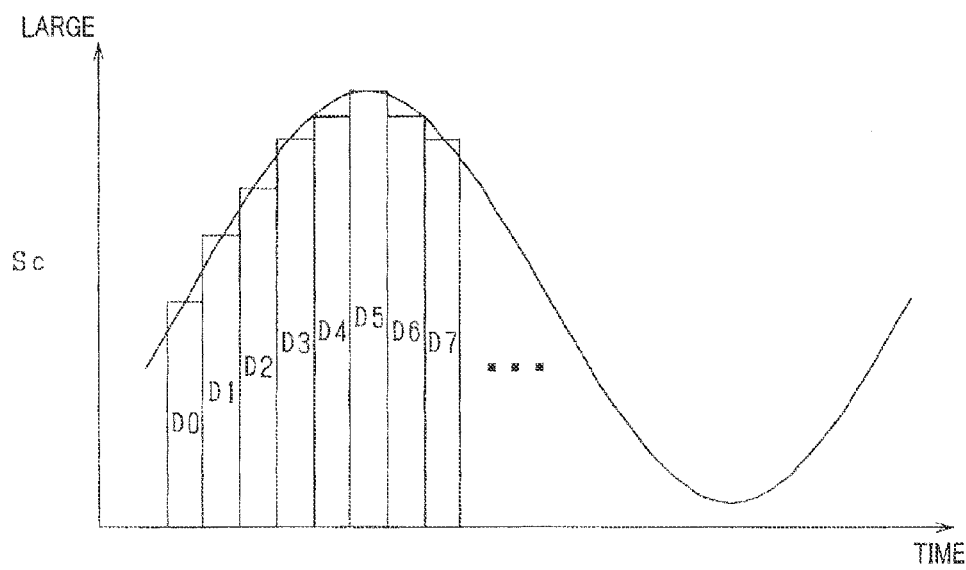

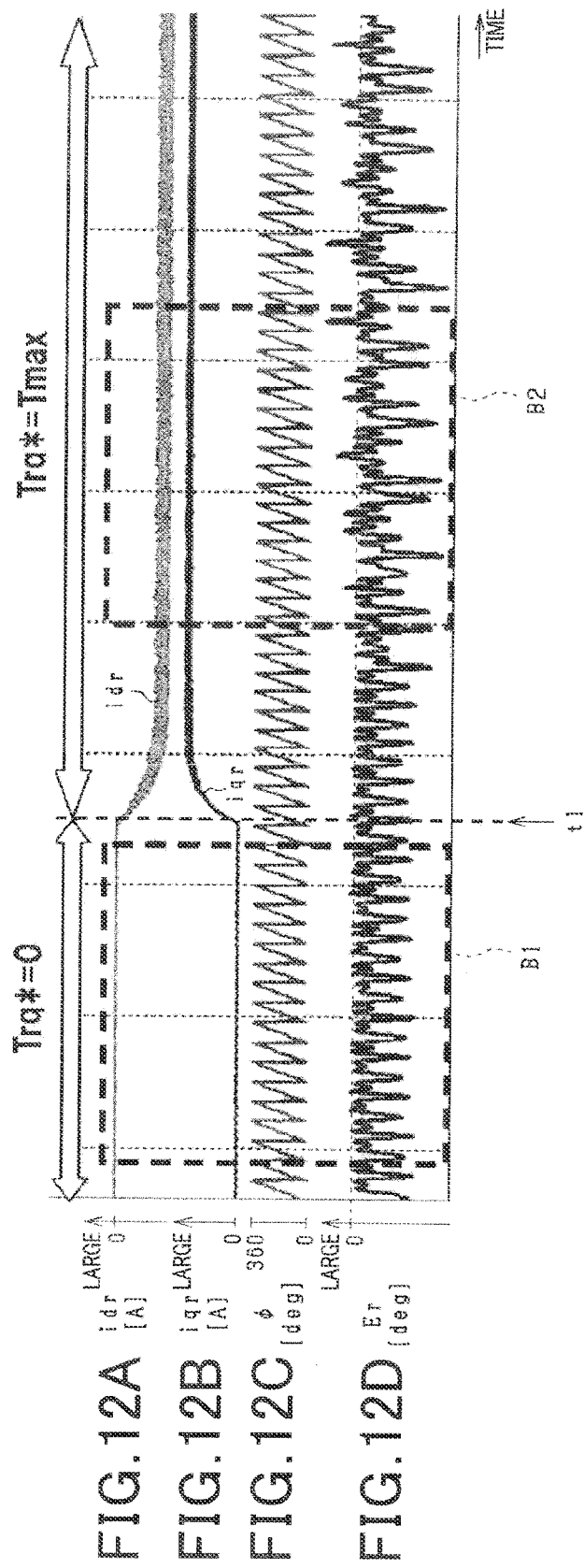

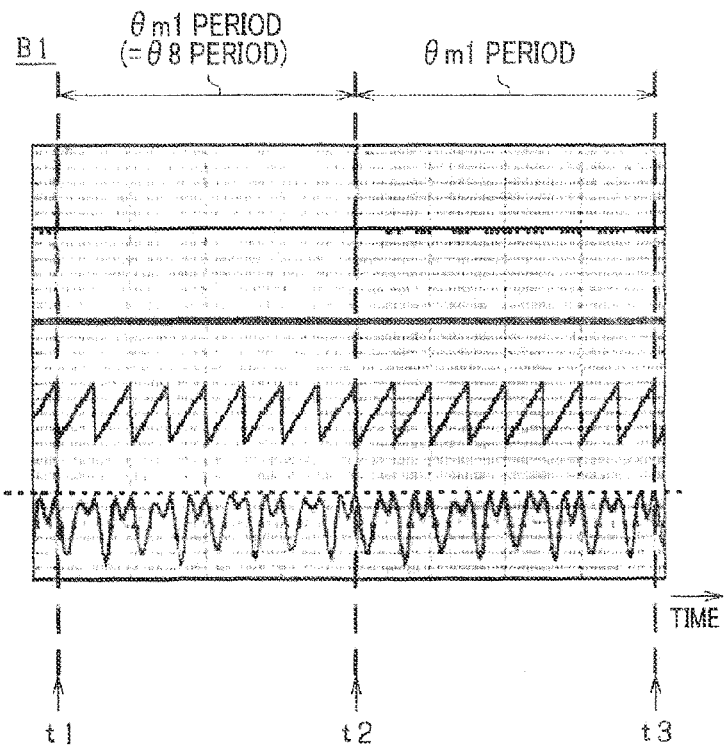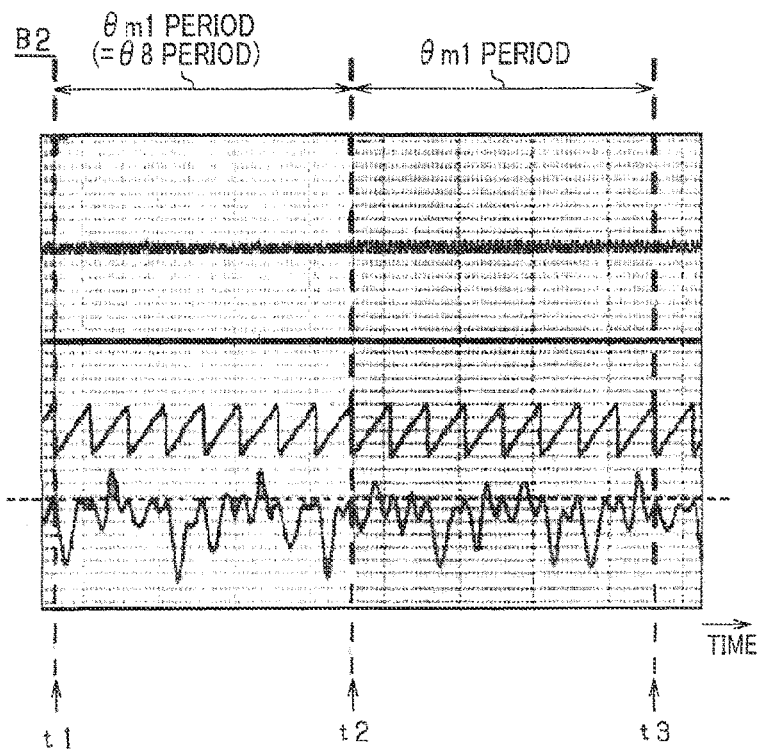

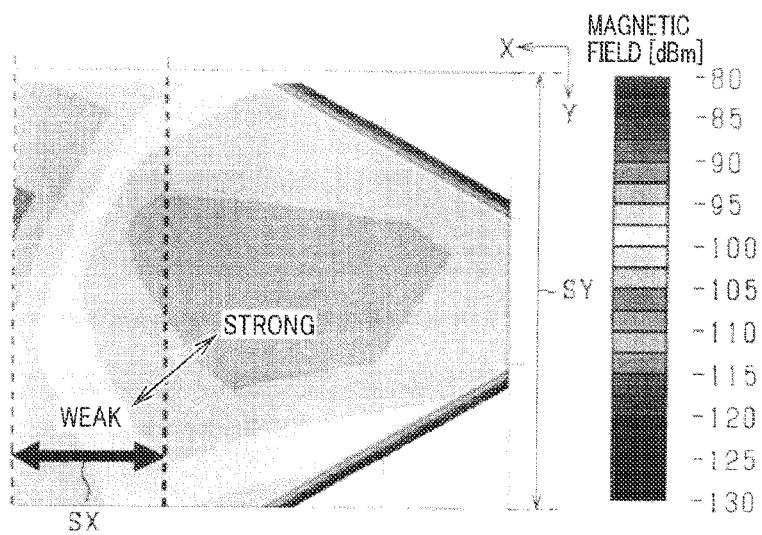
FIG.17A X AXIS
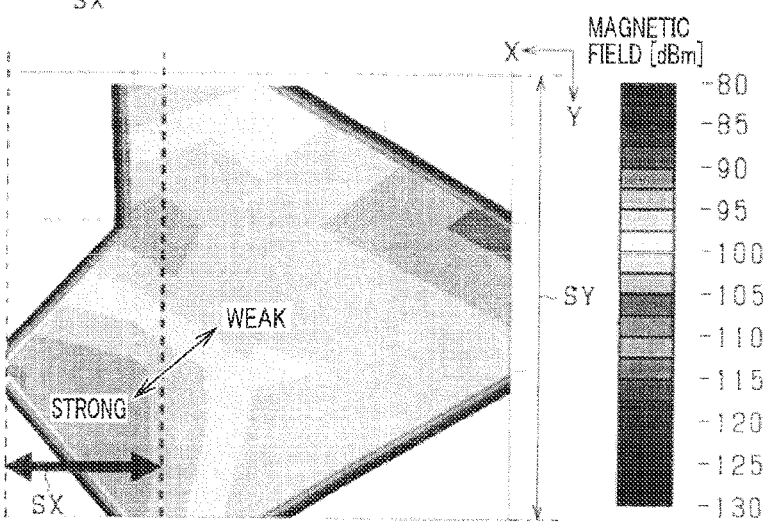
FIG.17B Y AXIS
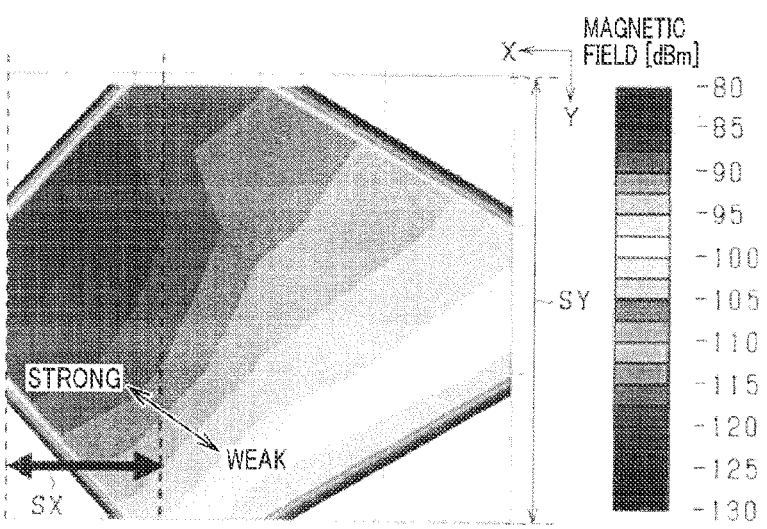
FIG.17C Z AXIS

ELECTRIC POWER CONVERSION CIRCUIT

CROSS-REFERENCE TO RELATED APPLICATION

This application is related to and claims priority from Japanese Patent Application No. 2013-123908 filed on Jun. 12, 2013, the contents of which are hereby incorporated by reference.

BACKGROUND OF THE INVENTION

1. Field of the Invention

The present invention relates to electric power conversion devices such as inverter devices comprised of switching elements and a control circuit for performing a turning-on and off control of the switching elements.

2. Description of the Related Art

A patent document 1, Japanese patent laid open publication No. 2012-139016, has disclosed a three phase inverter device. The three phase inverter device is comprised of switching elements, for example, insulated gate bipolar transistors (IGBTs), a control circuit substrate, direct current (DC) input terminals, a smoothing capacitor and a housing casing. A control circuit is mounted to the control circuit substrate. The control circuit controls the operation of each of the switching elements. The switching elements are connected to a battery through the DC input terminals and the smoothing capacitor. The smoothing capacitor performs a smoothing operation for a DC voltage supplied from the battery, and supplies the smoothed DC voltage to the switching elements. The housing casing accommodates the switching elements, the control circuit substrate, the DC input terminal, and the smoothing capacitor. The DC input terminals are noise sources. For example, switching noise (electromagnetic waves) is generated in the DC input terminals when the switching elements are turned on and off. There is accordingly a possibility of causing incorrect operation in the switching elements when the switching noise is propagated to the control circuit substrate.

In order to avoid this problem, the three phase inverter device has a metal plate which separates the DC input terminals from the control circuit substrate. The metal plate is bent to be arranged between the DC input terminal and the control circuit substrate. The metal plate prevents the propagation of switching noise generated in the switching noise source and suppresses the negative influence of the switching noise on the correct operation of the switching elements.

The inventors of the present invention have proposed a three phase inverter device having an improved structure in which the smoothing capacitor is arranged to face the plate surface of the control circuit substrate. For example, the housing casing of the three phase inverter device has a flat shape in order to miniaturize the whole size of the three phase inverter device.

However, because noise sources such as the DC input terminals are arranged close to the control circuit substrate in the three phase inverter device having the structure as previously described, the incorrect operation of the control circuit is often caused by switching noise propagated on the control circuit substrate. In this case, it can be considered to use the structure disclosed in the patent document 1 in order to reduce the switching noise propagated to the control circuit substrate. Although the technique disclosed in the patent document 1 can reduce the switching noise propagated to the control circuit substrate, this technique requires an additional metal plate in the three phase inverter device in order to reduce the switching noise. Accordingly, this structure increases the manufacturing cost and the whole size of the three phase inverter device.

The problem previously described would be caused in various types of electric power conversion devices such as three phase inverter devices so long as the electric power conversion device performs the switching control operation of the switching elements to convert an input voltage, i.e. a DC voltage to an output voltage, i.e. an alternating current (AC) voltage.

SUMMARY

It is therefore desired to provide an electric power conversion device capable of suppressing and preventing incorrect operation of various components formed on and in a control circuit substrate caused by switching noise, generated when switching elements are turned on and off, without increasing a whole size and manufacturing cost of the electric power conversion device.

An exemplary embodiment provides an electric power conversion device having switching elements, a control circuit, a multi-layer substrate and a smoothing capacitor. The control circuit generates and outputs drive signals to the switching elements to turn on and off the switching elements. The multi-layer substrate has a first surface, a second surface and interior layers. A solid pattern is formed in the interior layers. The smoothing capacitor is connected to the switching elements through conductive members.

The smoothing capacitor performs an operation of smoothing a direct current voltage to be supplied to the switching elements. In the electric power conversion device, the conductive members are formed in the multi-layer substrate at the first surface side of the multi-layer substrate. The smoothing capacitor is formed in an area corresponding to the first surface side. At least one of electronic components containing the control circuit and wiring patterns connected to the electronic components is formed on the second surface of the multi-layer substrate. Drive signals to be used for driving the switching elements are transmitted through the wiring patterns. The solid pattern is formed in the interior layers of the multi-layer substrate to separate the electronic components and the wiring patterns which are formed on the second surface of the multi-layer substrate from the smoothing capacitor and the conductive members.

In the structure of the electric power conversion device according to an exemplary embodiment, the solid pattern is formed in the multi-layer substrate to separate the electronic components and/or the wiring patterns formed on the second surface of the multi-layer substrate from the smoothing capacitor and the conductive members. The formation of the solid pattern can reduce noise propagated from noise generation sources to the electronic components and the wiring patterns. This structure makes it possible to suppress occurrence of incorrect operation of the switching elements and the multi-layer substrate.

Further, the solid pattern is formed as the interior layer in the inside of the multi-layer substrate. Through the solid pattern, the multi-layer substrate is grounded and electric power is supplied. The subject matter of the present invention uses the solid pattern to reduce switching noise propagated on the second surface of the multi-layer substrate. This structure makes it possible to prevent increase of the overall size of the electric power conversion device and a manufacturing cost.

BRIEF DESCRIPTION OF THE DRAWINGS

A preferred, non-limiting embodiment of the present invention will be described by way of example with reference to the accompanying drawings, in which:

FIG. 9A to FIG. 9C are views showing a relationship between a comparison value D, a counter value Cnt and a PWM signal generated by a PWM signal generation section in the electric power conversion device according to the first exemplary embodiment of the present invention;

FIG. 10 is a view showing a generation of an excitation signal used by the electric power conversion device according to the first exemplary embodiment of the present invention;

FIG. 12A to FIG. 12D are timing charts showing a phenomenon of increasing a resolver error Er;

FIG. 13A to FIG. 13D are timing charts showing a transition of the resolver error Er;

FIG. 14A to FIG. 14D are timing charts showing a transition of the resolver error Er;

FIG. 17A to FIG. 17C are views showing detection results of a distribution of a magnetic field strength on a first surface of the circuit substrate in a low voltage system side in the three phase inverter device according to the first exemplary embodiment of the present invention;

DETAILED DESCRIPTION OF THE PREFERRED EMBODIMENTS

Figure 1:
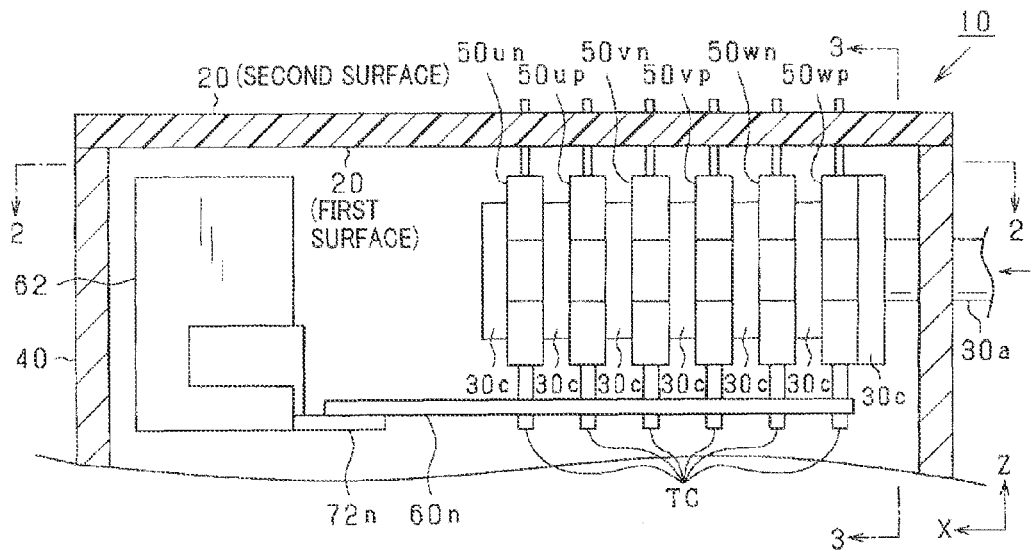
FIG. 1 is a cross sectional view of a three phase inverter device as an electric power conversion device, along the line 1-1 shown in FIG. 2, according to a first exemplary embodiment of the present invention.

Hereinafter, various embodiments of the present invention will be described with reference to the accompanying drawings. In the following description of the various embodiments, like reference characters or numerals designate like or equivalent component parts throughout the several diagrams.

First Exemplary Embodiment

A description will be given of a three phase inverter device as an electric power conversion device according to a first exemplary embodiment with reference to FIG. 1 to FIG. 22.

Figure 2:
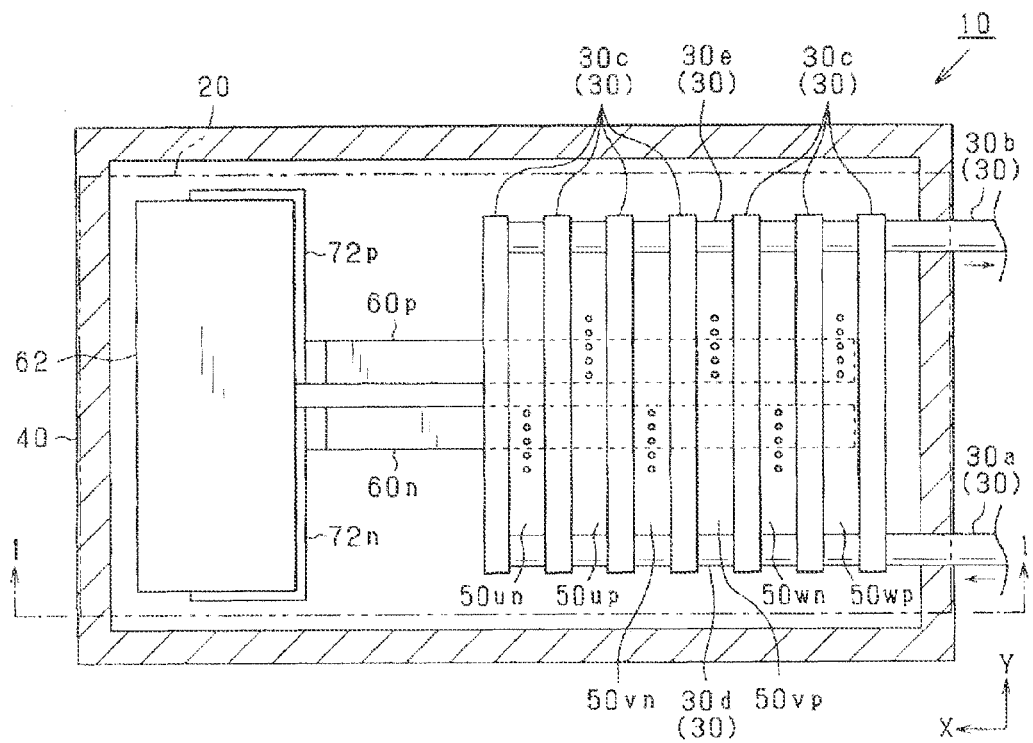
FIG. 2 is a cross sectional view of the three phase inverter device along the line 2-2 shown in FIG. 1.
Figure 3:
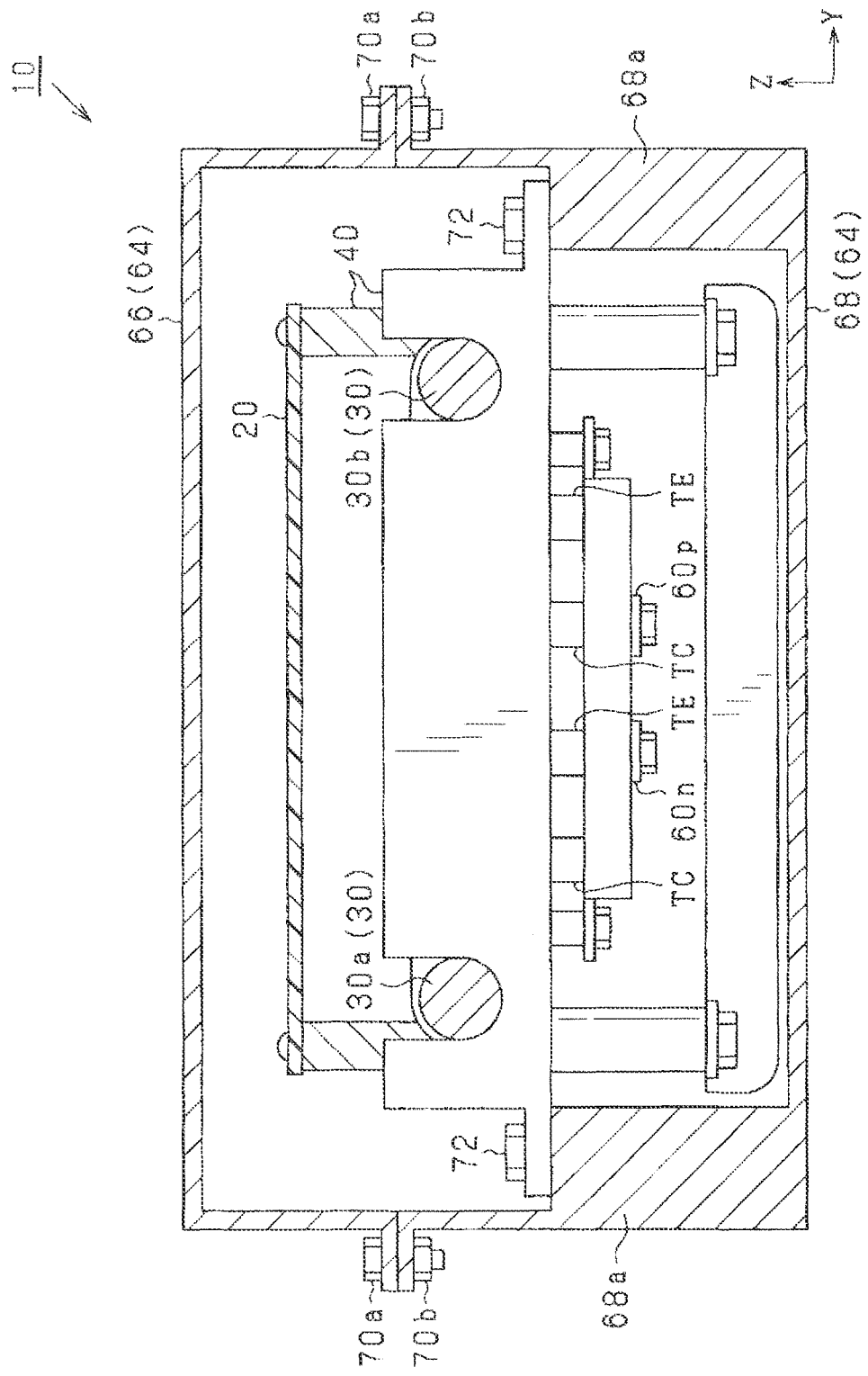
FIG. 3 is a cross sectional view of the three phase inverter device along the line 3-3 shown in FIG. 1.

FIG. 1 is a cross sectional view of the three phase inverter device 10 according to the first exemplary embodiment, along the line 1-1 shown in FIG. 2. FIG. 2 is a cross sectional view of the three phase inverter device 10 along the line 2-2 shown in FIG. 1. FIG. 3 is a cross sectional view of the three phase inverter device 10 along the line 3-3 shown in FIG. 1.

A description will now be given of a whole structure of the three phase inverter device 10 according to the first exemplary embodiment with reference to FIG. 1, FIG. 2 and FIG. 3.

As shown in FIG. 1, FIG. 2 and FIG. 3, the three phase inverter device 10 is comprised of a circuit substrate 20 (or a multi-layer substrate) having a multi-layer structure, a cooling device 30, a frame 40, semiconductor modules 50up, 50un, 50vp, 50vn, 50wp and 50wn (50$p and 50$n, where $=u, v and w), a positive electrode bus bar 60p, a negative electrode bus bar 60n, a smoothing capacitor 62 and a housing casing 64. The housing casing 64 accommodates the circuit substrate 20, the cooling device 30, the frame 40, the semiconductor modules 50up, 50un, 50vp, 50vn, 50wp and 50wn, the positive electrode bus bar 60p, the negative electrode bus bar 60n, and the smoothing capacitor 62. A detailed structure of each of the housing casing 64 and the frame 40 is omitted from FIG. 1 and FIG. 2.

The housing casing 64 has a cover 66 and a housing body 68. The housing casing 64 is made of a material (for example, metal and conductive resin) capable of electrically insulating switching noise (as electromagnetic waves). In general, switching noise is generated when switching elements provided in the semiconductor modules 50up to 50wn are turned on and off. The housing body 68 has a box-like shape and an opening section at one surface of the housing body 68. The opening section of the housing body 68 is closed when the cover 66 is fixed to the housing body 68 by a fixing section so that the cover 66 closes the opening section of the housing body 68. The fixing section is a bolt 70a and a nut 70b.

The housing body 68 has a pedestal section 68a to fix the frame 40. The housing body 68 accommodates the frame 40. The frame 40 is fixed to the housing body 68 by the fixing section (which is a bolt 72 used in the first exemplary embodiment). The circuit substrate 20 is fixed to the upper section of the frame 40.

The frame 40 accommodates the semiconductor modules 50up to 50wn and the smoothing capacitor 62. The smoothing capacitor 62 performs the operation of smoothing a DC voltage supplied to the semiconductor modules 50up to 50wn. Similar to the housing casing 64, the frame 40 is made of a material (for example, metal and conductive resin) capable of electrically insulating switching noise (as electromagnetic waves).

The circuit substrate 20 is a multi-phase substrate and a rectangular front shape. The circuit substrate 20 has a function for turning on and off the built-in switching elements in the semiconductor modules 50up to 50wn. Integrated circuits and a one chip microcomputer formed on the circuit substrate 20 provide the function of the circuit substrate 20. The structure and operation of the circuit substrate 20 will be explained later in detail.

The positive electrode bus bar 60p is connected to a positive electrode terminal of the smoothing capacitor 62 through a positive electrode terminal 72p. The negative electrode bus bar 60n is connected to a negative electrode terminal 72n of the smoothing capacitor 62 through a negative electrode terminal 72n. It is possible to use a single conductive member composed of the positive electrode bus bar 60p and the negative electrode bus bar 60n or two or more conductive members composed of the positive electrode bus bar 60p and the negative electrode bus bar 60n. The positive electrode bus bar 60p, the negative electrode bus bar 60n, the positive electrode terminal 72p and the negative electrode terminal 72n form the conductive members which will be used in the claims.

The smoothing capacitor 62, the positive electrode bus bar 60p, the negative electrode bus bar 60n, the positive electrode terminal 72p and the negative electrode terminal 72n are arranged on a first surface (as the smoothing capacitor 62 side) of the circuit substrate 20. In particular, the smoothing capacitor 62 is arranged to face the first surface of the circuit substrate 20. The specific arrangement of the smoothing capacitor 62 previously described miniaturizes a whole side of the three phase inverter device 10. That is, the three phase inverter device 10 according to the first exemplary embodiment is not equipped with any booster converter and a reactor which is an element forming the booster converter. The smoothing capacitor 62 is arranged instead of the reactor forming the booster converter at the first surface side of the circuit substrate 20 in the housing casing 64. This allows the housing casing 64 to have a plane shape and the three phase inverter device 10 to be miniaturized.

The cooling device 30 has a supply pipe 30a, a delivery pipe 30b, a plurality of cooling sections 30c, a first junction pipe 30d and a second junction pipe 30e. The supply pipe 30a introduces a cooling fluid as a coolant in the three phase inverter device 10. The delivery pipe 30b deliveries the cooling fluid from the three phase inverter device 10. The cooling sections 30c and the semiconductor modules 50up to 50wn are stacked together. The supply pipe 30a is connected to each of the cooling sections 30c through the first junction pipe 30d. The delivery pipe 30b is connected to the cooling sections 30c through the second junction pipe 30e. The cooling liquid is introduced through the supply pipe 30a to the first junction pipe 30d, the cooling liquid then flows in the cooling sections 30c. The cooling fluid in the cooling sections 30c is discharged to the delivery pipe 30b through the second junction pipe 30e. The cooling device 30 is fixed to the frame 40.

Each of the semiconductor modules 50up to 50wn has a structure in which the switching element and a freewheel diode are assembled to a module. In particular, the switching element is reversely connected to the freewheel diode. In the first exemplary embodiment, the $ phase semiconductor modules in an upper arm side will also be referred to the "$ phase upper arm modules 50$p (where $=u, v and w). Similarly, the $ phase semiconductor modules in a lower arm side will also be referred to the "$ phase lower arm modules 50$n (where $=u, v and w).

Figure 4:
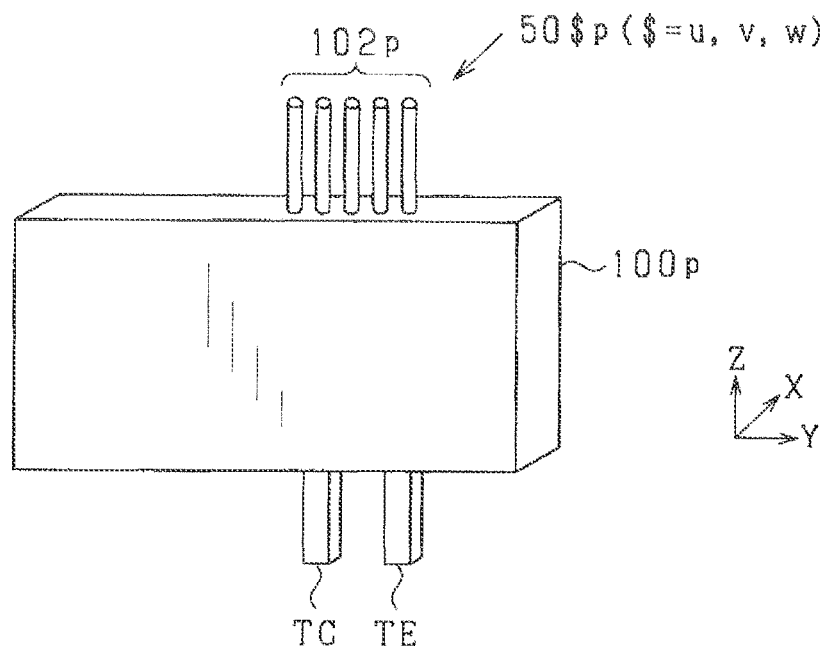
FIG. 4 is a perspective view showing a structure of a $ phase upper arm modules 50$p ($=u, v, w) used in the three phase inverter device according to the first exemplary embodiment of the present invention.

A description will now be given of the structure of the $ phase upper arm module 50$p with reference to FIG. 4. FIG. 4 is a perspective view showing a structure of the $ phase upper arm modules 50$p (S=u, v and w) used in the three phase inverter device 10 according to the first exemplary embodiment.

The $ phase upper arm module 50$p is equipped with a main section 100p, a plurality of control terminals 102p and a pair of power terminals. The main section 100p is composed of a $ phase upper arm switching element S$p and a freewheel diode D$p which are inversely connected together in parallel. The control terminals 102p are projected from the main section 100p. The power terminals are projected from the main section 100p. The control terminals 102p contain a terminal connected to a gate terminal of the $ phase upper arm switching element S$p. The power terminals is composed of a collector terminal TC connected to a collector of the $ phase upper arm switching element S$p and an emitter terminal TE connected to an emitter of the $ phase upper arm switching element S$p.

The main section 100p of the $ phase upper arm module 50$p has a plate-like shape. A plurality of the control terminals 102p are projected from one surface of the main section 100p so that the control terminals 102p are arranged to be perpendicular to this surface of the main section 100p. The collector terminal TC and the emitter terminal TE are projected from the other surface of the main section 100p so that the collector terminal TC and the emitter terminal TE are arranged to be perpendicular to the other surface of the main section 100p.

A description will now be given of the structure of the $ phase lower arm module 50$n in the three phase inverter device 10 with reference to FIG. 5.

Figure 5:
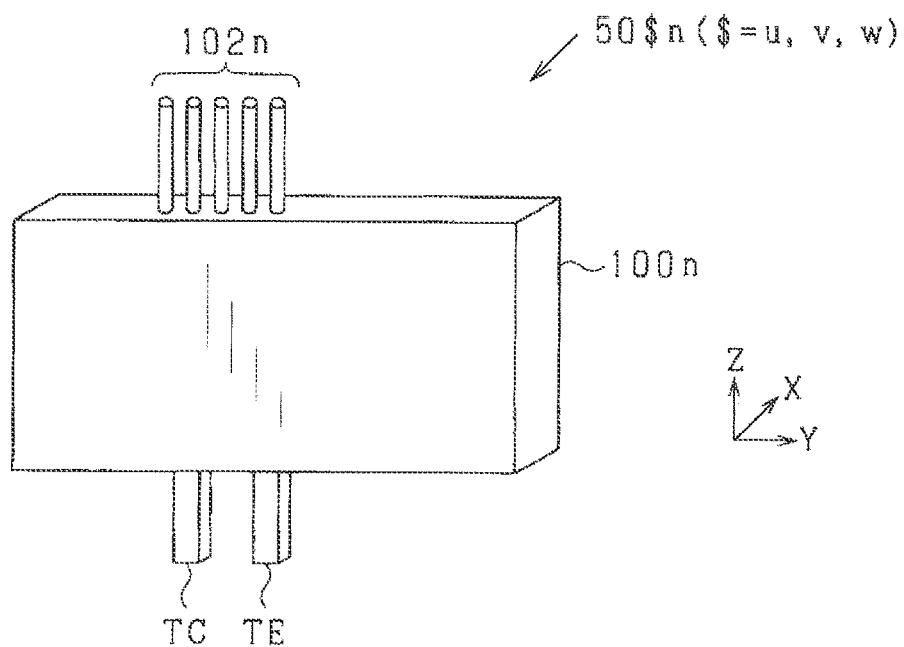
FIG. 5 is a perspective view showing a structure of a $ phase lower arm modules 50$n ($=u, v, w) used in the three phase inverter device according to the first exemplary embodiment of the present invention.

FIG. 5 is a perspective view showing a structure of the $ phase lower arm modules 50$n ($=u, v, w) used in the three phase inverter device 10 according to the first exemplary embodiment.

The $ phase lower arm module 50$n is equipped with a main section 100n, a plurality of control terminals 102n and a pair of power terminals. The main section 100n is composed of a switching element S$n in a lower am of a $ phase and a freewheel diode D$n which are inversely connected together in parallel. The control terminals 102n are projected from the main section 100n. The power terminals are projected from the main section 100n. Because the $ phase lower arm module 50$n and the $ phase upper arm module 50$p basically have the same structure. The explanation of the $ phase lower arm module 50$n is omitted here for brevity.

As shown in FIG. 1, FIG. 2 and FIG. 3, each of the $ phase upper arm modules 50up-50wp ($=U, V and W phases) is fixed to the circuit substrate 20 through the corresponding control terminals 102p. Further, each of the $ phase low arm modules 50un-50wn ($=U, V and W phases) is fixed to the circuit substrate 20 through the corresponding control terminals 102n. In more detail, each of the $ phase lower arm modules 50un-50wn and the $ phase upper arm modules 50up-50wp ($=U, V and W phases) is fixed to the circuit substrate 20 by solder. These modules are arranged in the order of 50un, 50up, 50vn, 50vp, 50wn and 50wp in a X axial direction to face the second surface of the circuit substrate 20 (as the surface of the housing casing 64).

Figure 6:
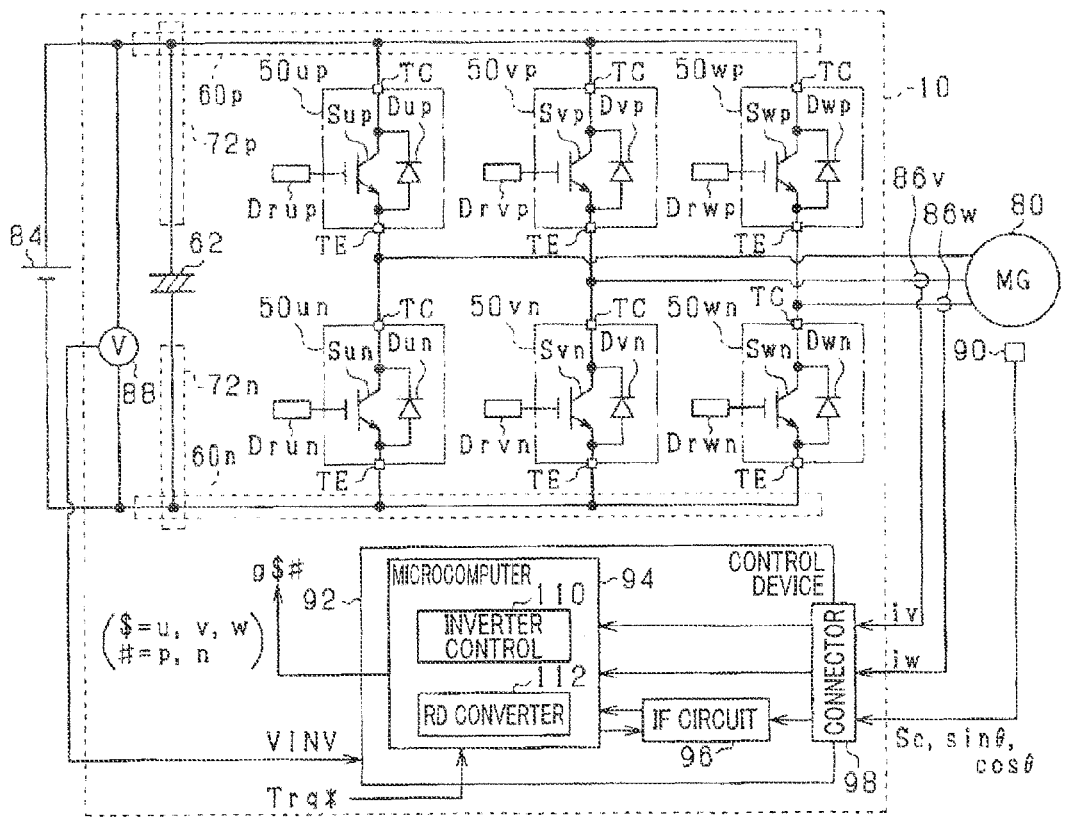
FIG. 6 is a view showing a whole structure of a motor control system according to the first exemplary embodiment of the present invention.

FIG. 6 is a view showing a whole structure of the motor control system having the three phase inverter device 10 according to the first exemplary embodiment.

As shown in FIG. 6, the motor control system is equipped with the three phase inverter device 10, a motor generator 80 and a control device 92. The motor generator 80 is connected to a drive shaft (not shown) and acts as a main drive machine, etc. In the first exemplary embodiment uses a permanent magnet synchronous motor which is the motor generator 80. In more detail, the permanent magnet synchronous motor is an interior permanent magnet synchronous motor (IPMSM). The motor generator 80 is an electric rotary machine and acts as an electric power generator and an electric rotary machine.

The three phase inverter device 10 is connected to a high voltage battery 84 as a DC power source, for example, a lithium ion rechargeable battery or a nickel rechargeable battery. The three phase inverter device 10, the motor generator 80 and the high voltage battery 84 form the in-vehicle high voltage system. The in-vehicle high voltage system is used in the claims.

The collector terminals TC of the $ ($=U, V and W) phase upper arm modules 50up to 50wp are connected together through the positive electrode bus bar 60p. The emitter terminals TE of the $ ($=U, V and W) phase lower arm modules 50un to 50wn are connected together through the negative electrode bus bar 60n. The positive electrode bus bar 60p is connected to the positive electrode terminal of the high voltage battery 84. The negative electrode bus bar 60n is connected to the negative electrode terminal of the high voltage battery 84.

The emitter terminal TE of the $ phase upper arm module 50$p is connected to the collector terminal TC of the $ phase lower arm module 50$n. A connection node between the emitter terminal TE of the $ phase upper arm module 50$p and the collector terminal TC of the $ phase lower arm module 50$n is connected to the $ phase of the motor generator 80.

The motor control system is equipped with a V phase current sensor 86v, a W phase current sensor 86w and a voltage sensor 88. The V phase current sensor 86v detects a current which flows in the V phase of the motor generator 80. The W phase current sensor 86w detects a current which flows in the W phase of the motor generator 80. The voltage sensor 88 detects an input voltage of the three phase inverter device 10. The motor control system is equipped with a resolver which detects a rotation angle (electrical angle θ) of the motor generator 80.

The control device 92 receives an output signal of each of the various types of the sensors. The control device 92 is equipped with a microcomputer 94, an interface circuit 96 as an analogue integrated circuit (analogue IC) and the circuit substrate 20. The microcomputer 94 is comprised of a central processing unit (CPU), a read only memory (ROM) and a random access memory (RAM), etc. The microcomputer 94 and the interface circuit 96, etc. are arranged on the circuit substrate 20. The microcomputer 94 receives the output signals transmitted from the V phase current sensor 86v and the W phase current sensor 86w through a connector 98 formed on the circuit substrate 20. The microcomputer 94 receives the output signal transmitted from the resolver 90 through the connector 98 and the interface circuit 96.

The microcomputer 94 is equipped with a resolver digital converter (hereinafter, referred to as the "RD converter 112"). In the first exemplary embodiment, the microcomputer 94 forms the control circuit which is used in the claims.

A description will now be given of the process of adjusting a control amount for the motor generator 80 performed by the inverter control section 110 with reference to FIG. 7.

Figure 7:
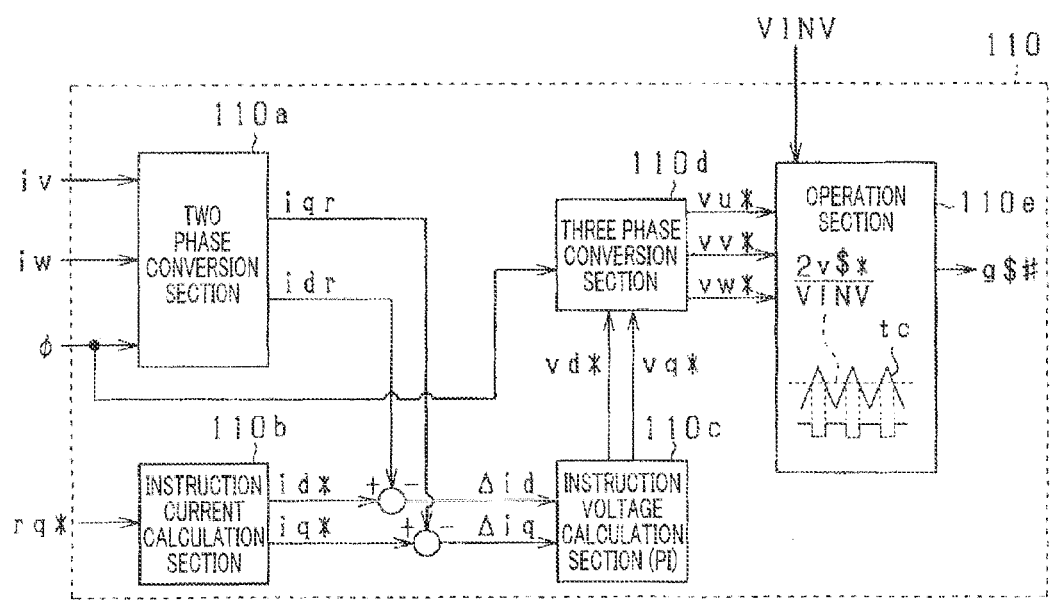
FIG. 7 is a block diagram showing a structure of an inverter control device in the three phase inverter device according to the first exemplary embodiment of the present invention.

FIG. 7 is a block diagram showing a structure of the inverter control device 110 in the three phase inverter device according to the first exemplary embodiment.

The inverter control section 110 in the three phase inverter device according to the first exemplary embodiment adjusts an output torque as the control amount.

The inverter control section 110 instructs the switching elements S$# to be turned on and off so that an instruction current becomes equal to a current flowing in the motor generator 80. The instruction current indicates for the motor generator 80 to output an output torque instruction value Trg*. That is, the output torque of the motor generator 80 becomes the control amount. The inverter control section 110a directly adjusts the instruction current in order for the motor generator 80 to output the output torque instruction value Trg*. In particular, the inverter control section 110 in the three phase inverter device 10 according to the first exemplary embodiment adjusts a current vector in order that the current flowing in the motor generator 80 becomes equal to the instruction current.

In more detail, a two phase conversion section 11a converts a U phase current iu, a V phase current iv, and a W phase current iw to a d-axis current idr and a q-axis current iqr in a rotary coordinate system on the basis of the detected value iv detected by the V phase current sensor 86v, the detected value iw detected by the W phase current sensor 86w and the calculated electrical angle θ (hereinafter, will also be referred to as the calculated angle ϕ) outputted from the RD converter 112. It is sufficient to calculate the W phase current iw on the basis of the detected value iv detected by the V phase current sensor 86v, the detected value iw detected by the W phase current sensor 86w by using the Kirchhoff's circuit laws.

An instruction current calculation section 110b calculates a d-axis current id* and a q-axis current iq* which are instruction currents in a rotary coordinate system on the basis of the torque instruction value Trq*. For example, a control device, which is arranged at an upper instruction side when compared with the control device 92, outputs the torque instruction value Trg*.

An instruction voltage calculation section 110c calculates a d-axis instruction voltage vd* and a q-axis instruction voltage vq* as operation amounts to be used for performing a feedback control to adjust the d-axis current idr and a q-axis current iqr to the d-axis current id* and the q-axis current iq*. Specifically, the instruction voltage calculation section 110c performs a proportional integration control on the basis of a difference Δid between the d axis current idr and the d-axis instruction current id* in order to obtain the d-axis instruction voltage vd*. Further, the instruction voltage calculation section 110c performs the proportional integration control on the basis of a difference Δiq between the q-axis current iqr and the q-axis instruction current iq* in order to obtain the q-axis instruction voltage vq*.

A three phase conversion section 110d converts the d-axis instruction voltage vd* and the q-axis instruction voltage vq* to three phase instruction voltages v$* ($=u, v and w) in a fixed coordinate system of the motor generator 80 on the basis of a calculation angle ϕ outputted from a RD converter 58. These instruction voltages v$* are sine wave signals used as operation amounts in order to perform the feedback control to adjust the d-axis current idr and the q-axis current iqr to the d-axis current id* and the q-axis current iq*.

An operation section 110e generates a drive signal g$# in order to adjust the three phase output voltage of the three phase inverter device 10 to a voltage close to the instruction voltage v$*. The operation section 110e in the three phase inverter device 10 according to the first exemplary embodiment performs a PWM process on the basis of a difference between a value of "2×v$*/VINV" and a carrier signal tc (for example, which is a triangle wave signal) in order to generate the drive signal g$#. The value of "2×v$*/VINV is obtained by performing the normalization of the instruction voltage v$* on the basis of the input voltage VINV of the three phase inverter device 10.

The operation section 110e generates and outputs the drive signal g$# to the drive circuit Dr$#. The drive circuit Dr$# serves as a gate drive circuit capable of charging and discharging the gate of the switching element S$# on the basis of the drive signal g$#. The drive circuit Dr$# turns on and off the corresponding switching element S$#.

A description will now be given of a structure of the resolver 90 and the process of calculating an electrical angle θ outputted from the RD converter 112 with reference to FIG. 8.

Figure 8:
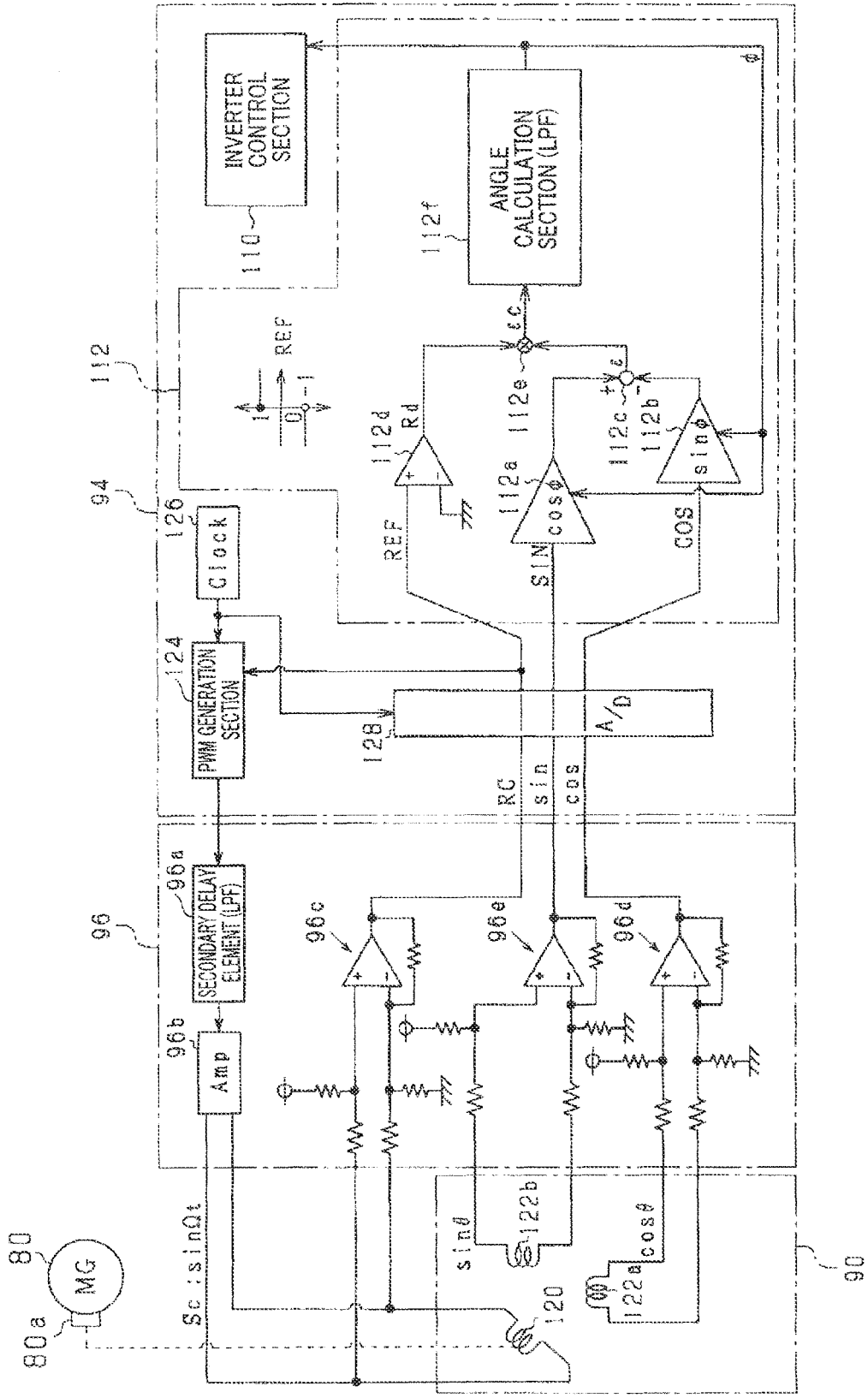
FIG. 8 is a view showing a schematic circuit diagram of calculating an electrical angle obtained by a RD converter in the electric power conversion device according to the first exemplary embodiment of the present invention.

FIG. 8 is a view showing a schematic circuit diagram of calculating an electrical angle θ by the RD converter 112 in the electric power conversion device according to the first exemplary embodiment.

The resolver 90 is composed of a primary coil 120 and a pair of secondary coils 122a and 122b. In more detail, the primary coil 120 of the resolver 90 is connected to a rotor 80a of the motor generator 80. The primary coil 120 is excited by an excitation signal Sc having a sine curve wave. The magnetic flux generated in the primary coil 120 by the received excitation signal Sc interlinks the pair of the secondary coils 122a and 122b. At this time, because the positional relation between the primary coil 120 and the secondary coils 122a and 122b is periodically changed due to a rotational angle of the rotor 80a, the number of the magnetic flux interlinked with the secondary coils 122a and 122b is also periodically changed. In the electric power conversion device according to the first exemplary embodiment, the primary coil 120 and the secondary coils 122a and 122b are arranged so that a phase of a voltage generated in the secondary coil 122a is shifted to a phase of a voltage generated in the secondary coil 122b by π/2. This arrangement produces modulated waves in which the excitation signal Sc is modulated by a modulation wave sin θ and a modulation wave cos θ. Each of the secondary coils 122a and 122b outputs the modulated wave. In more detail, when the excitation signal Sc is designated with sin Ωt, the modulated waves are expressed by sin θ×sin Ωt and cos θ×cos Ωt, respectively.

Because the electric power conversion device according to the first exemplary embodiment uses the motor generator 80 having eight poles, the number of the axial double angles of the resolver 90 is eight. Accordingly, the rotary angle (as a mechanical angle θm) of the rotor 80a of the motor generator 80 is obtained by dividing the calculated angle ϕ outputted from the RD converter 112 with the number of the axial double angles.

The excitation signal Sc is generated by a combination of a PWM generation section 124 and an oscillation unit 126 in the microcomputer 94, and a secondary delay element 96a and an amplifier circuit 96b in the interface circuit 96. In more detail, the PWM generation section 124 generates a counter value Cnt and a PWM signal (as a binary signal) in synchronization with a clock signal. The PWM generation section 124 receives the clock signal transmitted from the oscillation unit 126 every predetermined period, and increases the counter value Cnt by one for every received clock signal. Further, the PWM generation section 124 generates the PWM signal which is used to generate the excitation signal Sc. In the first exemplary embodiment, the interface circuit 96 is composed of an analogue integrated circuit (analogue IC) capable of performing one of processes of calculating an electrical angle θ. The drive signals g$# are generated on the basis of the electrical angle θ.

FIG. 9A to FIG. 9C are views showing a relationship between the comparison value D, the counter value Cnt and the PWM signal generated by the PWM signal generation section 124 in the electric power conversion device according to the first exemplary embodiment.

As shown in FIG. 9, the PWM generation section 124 generates a PMW signal having a logical high level (H) when the counter value Cnt is less than the comparison value D. The PWM generation section 124 generates a PMW signal having a logical low level (L) when the counter value Cnt is not less than the comparison value D. Further, the PWM generation section 124 resets the counter value Cnt to zero when the counter value Cnt reaches an upper limit value Tlim. That is, the PWM generation section 124 generates the counter value Cnt having a saw tooth wave in a digital form.

The PWM generation section 124 updates the comparison value D every one period counted from the time when the counter value Cnt has a bottom limit value (0) to the time when the counter value Cnt has the upper limit value Tlim. The comparison value D varies due to the period of the excitation signal Sc.

As shown in FIG. 8, the secondary delay element 96a receives the PWM signal transmitted from the PWM generation section 124. The amplifier circuit 96b amplifies the output voltage of the secondary delay element 96a and outputs the amplified output voltage of the secondary delay element 96a as the excitation signal Sc.

FIG. 10 is a view showing a generation of the excitation signal Sc generated in the electric power conversion device according to the first exemplary embodiment. As shown in FIG. 10, the excitation signal Sc is periodically changed on the basis of time elapse.

As shown in FIG. 8, the primary coil 120 outputs a differential signal Sc, which corresponds to the excitation signal Sc, to a first differential amplifier circuit 96c through connectors 98 (not shown). The first differential amplifier circuit 96c receives the differential signal Sc and converts the received differential signal Sc to a single end signal RC. The first differential amplifier circuit 96c outputs the single end signal RC to an analogue to digital conversion unit (AD conversion unit).

On the other hand, as shown in FIG. 8, the secondary coil 122a outputs a differential signal cos θ to a second differential amplifier circuit 96d. When receiving the differential signal cos θ, the second differential amplifier circuit 96d converts the differential signal cos θ to a single end signal cos, and outputs the single end signal cos to a sine function multiplier unit 112b.

Further, the secondary coil 122b outputs a differential signal sin θ to a third differential amplifier circuit 96e. When receiving the differential signal sin θ, the third differential amplifier circuit 96e converts the differential signal sin θ to a single end signal sin, and outputs the single end signal sin to a cosine function multiplier unit 112a. Each of the differential signals Sc, cos θ and sin θ and the single end signals RC, cos and sin are analogue signals. In the electric power conversion device according to the first exemplary embodiment, these signals Sc, cos θ, sin θ, RC, cos and sin are signals of the resolver 90. These differential signals Sc, cos θ and sin θ, and the single end signal RC, cos and sin of the resolver 90 and signals of a V phase current sensor 86v and a W phase current sensor 86w correspond to drive signals of the switching elements S$#.

The first, second and third differential amplifier circuits 96c, 96d and 96e output the single end signals to the AD converter unit 128 incorporated in the microcomputer 94. The AD converter unit 128 serves as an analogue to digital conversion section capable pf performing the sampling of the single end signals RC, sin and cos every a predetermined sampling period Tad. In more detail, the AD conversion unit 128 performs the sampling of the single end signal RC and converts it to digital data at the predetermined sampling period Tad in synchronization with the clock signal transmitted from the oscillation unit 126.

Further, the AD conversion unit 128 performs the sampling of the modulated wave "sin" in synchronization with the clock signal. In other words, the AD conversion unit 128 converts the modulated wave "sin" to digital data in synchronization with the clock signal. The modulated wave sin is also the single end signal as previously described.

Still further, the AD conversion unit 128 performs the sampling of the modulated wave cos, i.e. converts the modulated wave cos to digital data in synchronization with the clock signal. The modulated wave cos is also the single end signal as previously described.

In FIG. 8, after the sampling process, the single end signal RC (which corresponds to the excitation signal Sc and the differential signal Sc) is designated with a reference signal REF. In FIG. 8, the modulated wave sin and the modulated wave cos after the sampling are designated with a reference character "SIN" and a reference character "COS", respectively.

The electric power conversion device according to the first exemplary embodiment uses the sampling period Tan having a predetermined fixed value (for example, 6.25 μsec). In particular, the sampling period is obtained by dividing one period of the excitation signal Sc by an integer of not less than 2, for example 16.

The RD converter 112 receives an output signal transmitted from the AD conversion unit 128, and processes the received output signal by a software program. In more detail, the cosine function multiplier unit 112a multiplies the modulated wave SIN by a cosine function cos θ, where the cosine function cos φ depends on a variable of the calculated electrical angle θ (as the calculated angle φ).

On the other hand, the sine function multiplier unit 112b multiplies the modulated wave COS by a sine function sin φ, where the sine function cos φ depends on a variable of the calculated electrical angle θ (as the calculated angle φ).

A control deviation calculation section 112c subtracts the output value of the sine function multiplier unit 112b from the output value of the cosine function multiplier unit 112a to calculate a control deviation ϵ.

The control deviation ϵ can be expressed by the following equation eq1 when no consideration is given to proportional constants determined by gains of the first differential amplifier circuit 96c, the second differential amplifier circuit 96d, the third differential amplifier circuit 96e and the amplifier circuit 96b.

$$\epsilon = \sin \Omega t \cdot \sin \theta \cdot \cos \phi - \text{son } \Omega t \cdot \cos \theta \cdot \sin \phi, = \sin \Omega t \cdot \sin (\theta - \phi) \quad \text{(eq1)}.$$

The process of eliminating influence caused by a sign of the excitation signal Sc is performed by a synchronous detection.

The RD converter 112 receives the output signal of the AD conversion unit 128. That is, a detection signal generation unit 112d in the RD converter 112 receives the reference signal REF. The detection signal generation unit 112d generates a detection signal Rd having a value of 1 or −1 on the basis of a difference between the signal REF and a value of zero. In more detail, the detection signal generation unit 112d generates the detection signal Rd having a value of 1 when the signal REF is not less than zero. Further, the detection signal generation unit 112d generates the detection signal Rd having a value of 0 when the signal REF is less than zero.

A synchronous detection unit 112e multiplies the control deviation ϵ and the detection signal Rd together to calculate a detection value ϵC. The detection value ϵc has a value of zero when a difference between an actual electrical angle θ and a calculated angle φ becomes zero. A sign of the detection value ϵC indicates whether the calculated angle φ is advanced or delayed from the actual angle θ.

The detection value ϵC is a demodulated signal outputted from the synchronous detection unit 112e. An angle calculation section 112 receives the detection value ϵc. The angle calculation section 112f is comprised of a low pass filter and an integration element. The electric power conversion device according to the first exemplary embodiment uses a double integral element as the integration element because no steady deviation, i.e. no varying offset is generated in the calculated angle φ when the electrical angle θ varies at a constant speed.

The low pass filter eliminates a higher harmonic wave component from the detection value Ec. The low pass filter in the angle calculation section 112f outputs the calculated angle φ to the cosine function multiplier unit 112a, the sine function multiplier unit 112b and the inverter control device 110.

A description will now be given of a difference in arrangement of components between the first exemplary embodiment and a related art with reference to FIG. 11.

Figure 11:
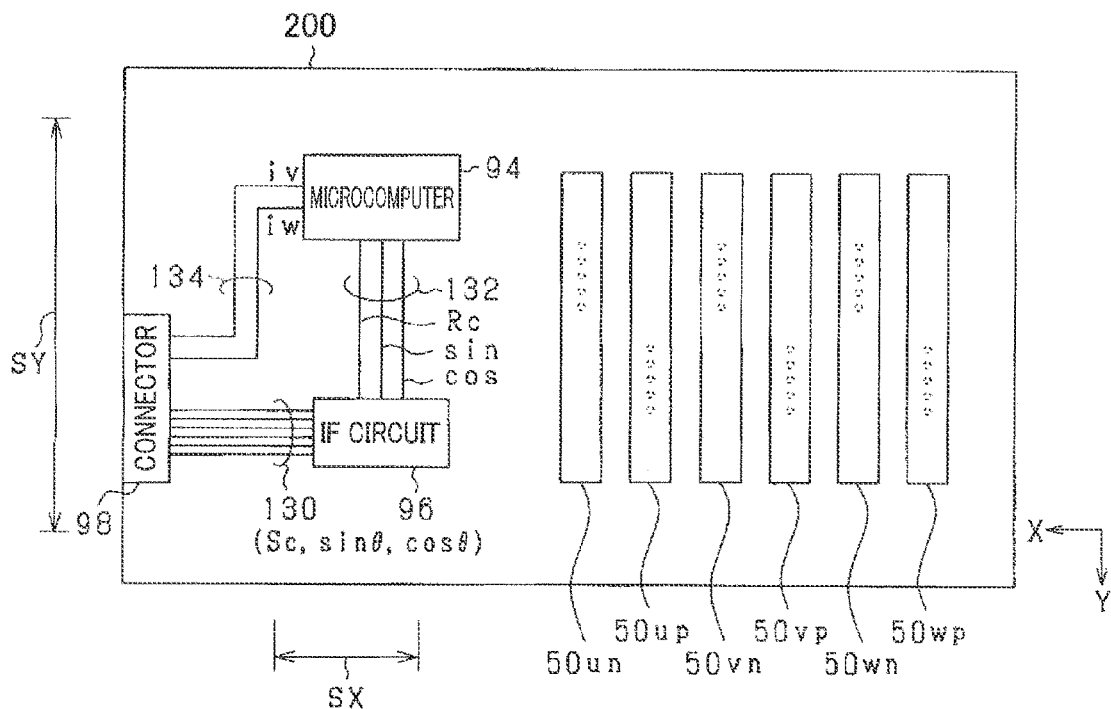
FIG. 11 is a plan view showing a smoothing capacitor mounted to a circuit substrate according to a related art of the present invention.

FIG. 11 is a plan view showing a circuit substrate 200 according to a related art. The circuit substrate 200 according to the related art shown in FIG. 11 is observed from a first surface side thereof, i.e. the smoothing capacitor 62 side.

As shown in FIG. 11, the connector 98, the microcomputer 94 and the interface circuit 96 are formed on a first surface of the circuit substrate 200. The connector 98 is formed at the end part of the circuit substrate 200. A differential wiring pattern 130 (made of copper foil, for example) is formed as a second wiring pattern on the first surface of the circuit substrate 200. Through the differential wiring pattern 130, the connector 98 and the interface circuit 96 are connected together.

Three pairs of differential signals are transmitted from the resolver 90 to the first, second and third differential amplifier circuits 96c, 96d and 96e, respectively through the differential wiring pattern 130. A single wiring pattern 132 is formed as a first wiring pattern on the first surface of the circuit substrate 200. The interface circuit 96 and the microcomputer 94 are connected together through the single wiring pattern 132. The first, second and third differential amplifier circuits 96c, 96d and 96e generate and transmit the single end signal RC, the single end signal sin and the single end signal con to the microcomputer 94 through the single wiring pattern 132. Furthermore, a current wiring pattern 134 is formed on the first surface of the circuit substrate 200. The connector 98 and the microcomputer 94 are connected together through the current wiring pattern 134. The V phase current sensor 86v and the W phase current sensor 86w shown in FIG. 6 generate and transmit output signals iv and iw, respectively to the connector 98 through the current wiring pattern 134.

In the structure of the related art, a group of the microcomputer 94, the interface circuit 96, the differential wiring pattern 130, the single wiring pattern 132 and the current wiring pattern 134 is arranged to face the smoothing capacitor 62 on the first surface of the circuit substrate 200. In the structure of the first surface of the circuit substrate 200, the inventors of the present invention have found that a detection accuracy of the RD converter 112 to calculate an electrical angle θ is decreased when a current (as a phase current) flowing in the motor generator 80 is increased by turning on and off the switching elements S$#.

A description will now be given of this problem of the related art found by the inventors of the present invention with reference to FIG. 12 to FIG. 16.

FIG. 12A to FIG. 12D are timing charts showing a phenomenon of increasing a resolver error generated in the resolver 90. That is, FIG. 12A to FIG. 12D shows the transition of the waves when the torque instruction value Trq* is increased from a value of zero (Trq*=0) to the maximum value as the torque maximum value Tmax (Trq*=Tmax). In more detail, FIG. 12A shows the transition of the d axis current idr. FIG. 12B shows the transition of the q axis current iqr. FIG. 12C shows the transition of the calculated angle φ. FIG. 12D shows the transition of an error (hereinafter, the resolver error Er) of the calculated angle φ to the actual electrical angle θ.

The example of the transition shown in FIG. 12 A to FIG. 12D, the torque instruction value Trq* is switched from zero to Tmax at the timing t1. The resolver error Er occurs before the timing t1 and is increased after the timing t1.

FIG. 13A to FIG. 13D are timing charts showing the transition of the resolver error Er. FIG. 14A to FIG. 14D are timing charts showing the transition of the resolver error Er. In particular, FIG. 13A to FIG. 13D are enlarged views showing the transition of the waves during the time period B1 in which the torque instruction value Trq* has a value of zero (Trq*=0). FIG. 14A to FIG. 14D are enlarged views showing the transition of the waves during the time period B2 in which the torque instruction value Trq* has the maximum value (Trq*=Tmax).

The number of the axial double angles of the resolver 90 used in the first exemplary embodiment is eight. Accordingly, one period of the mechanical angle θm (as the rotary angle of the rotor 80a of the motor generator 80) corresponds to eight periods of the electrical angle θ.

As shown in FIG. 13A to 13D, the resolver error Er is generated even if the torque instruction value Trq* has a value of zero. The resolver error Er has a period in synchronization with one period of the electrical angle θ. The electric power conversion device according to the first exemplary embodiment uses the synchronization of the resolver error Er in order to reduce the resolver error Er.

For example, the electric power conversion device according to the first exemplary embodiment stores the resolver error Er every electrical angle θ during a previous period of the mechanical angle θ (from the timing t1 to the timing t2) into a memory section such as the RAM in the microcomputer 94. Each of the electrical angle θ during the current period of the mechanical angle θ is corrected on the basis of the previous resolver error Er stored in the memory section in order to reduce the resolver error Er.

On the other hand, as shown in FIG. 14, when the torque instruction value Trq* has the maximum value Tmax, the resolver error Er is increased and the periodicity of the resolver error Er is destroyed. It is difficult to reduce the resolver error Er on the basis of the periodicity of the resolver error Er in synchronization with the electrical angle θ.

Figure 15:
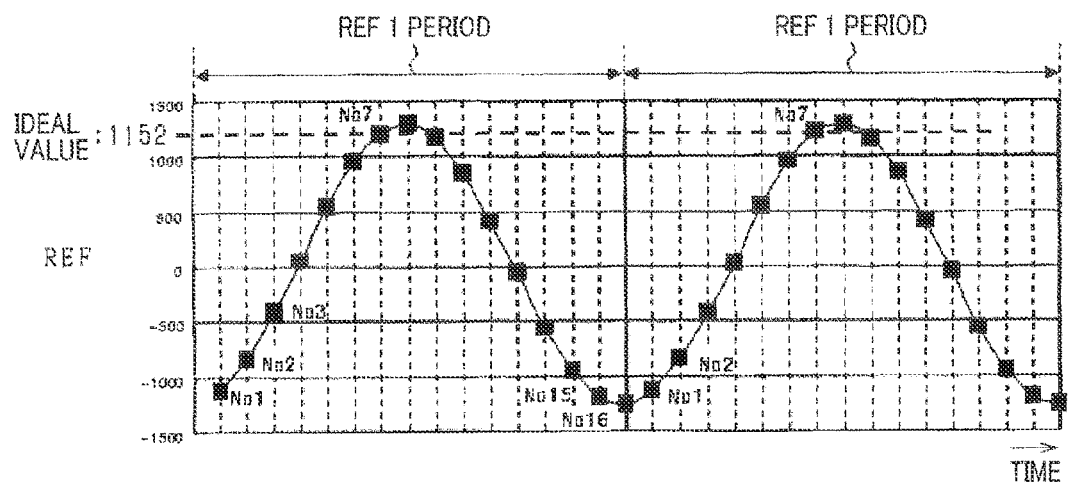
FIG. 15 is a view showing a behavior of an ideal reference signal REF when a period of an excitation signal Sc is 100 µsec and a sampling period Tad is 6.25 µsec.

FIG. 15 is a view showing a behavior of the ideal reference signal REF when a period of the excitation signal Sc is 100 μsec and the sampling period Tad is 6.25 μsec. FIG. 15 shows the behavior of the reference signal REF in digital form.

As shown in FIG. 15, the electric power conversion device according to the first exemplary embodiment uses the sampling period Tad obtained by dividing the period of the excitation signal Sc by an integer. Accordingly, the N-th sampled value of the ideal reference signal REF becomes the same value every period. In the case shown in FIG. 15, the seventh sampled value has the same value every period as designated with the ideal value.

Figure 16:
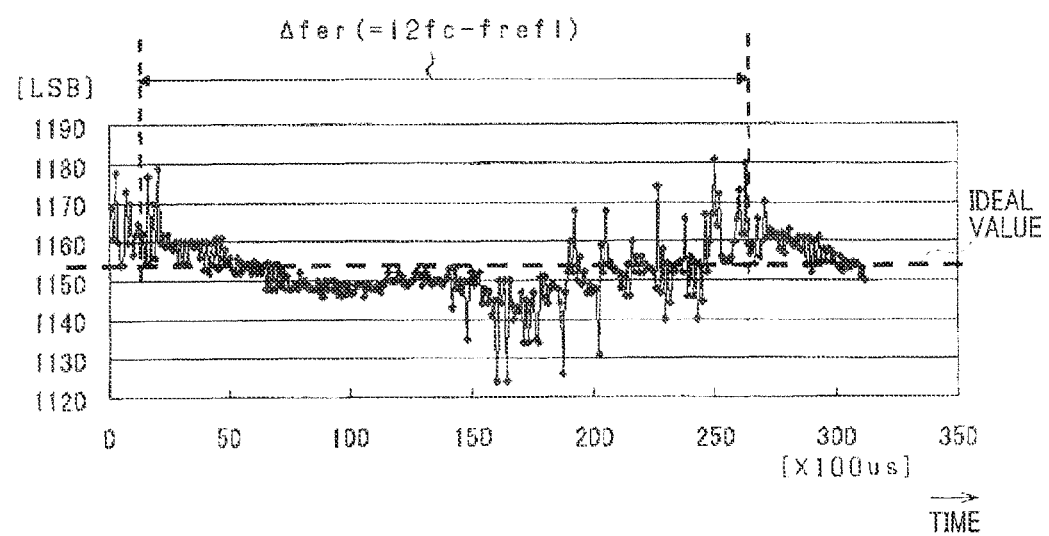
FIG. 16 is a view showing a transition of an actual reference signal REF when a motor generator rotates at 1000 rpm and a carrier signal tc has a carrier frequency fc of 4.98 kHz.

FIG. 16 is a view showing a transition of an actual reference signal REF when a motor generator rotates at 1000 rpm and a frequency of a carrier signal tc (hereinafter, the carrier frequency fc) is 4.98 kHz. In more detail, FIG. 16 shows the arrangement of the seventh reference signal REF.

As shown in FIG. 16, when no noise is mixed in the reference signal REF, the reference signal has the same value as previously described. However, in a practical use, a resolver error Er having an error frequency Δfer (40 Hz) is mixed in the reference signal REF. The error frequency Δfer becomes the absolute value of a difference between the frequency which is twice of the carrier frequency fc and the frequency fref of the excitation signal Sc.

It can be considered that the resolver error Er increases under the condition when the torque instruction value Trq* is increased even if noise is mixed in signals such as modulated wave SIN and the modulated wave COS, as well as the reference signal REF, before the low pass filter in the angle calculation section 112f.

FIG. 17A to FIG. 17C are views showing detection results of a distribution of a magnetic field strength (as a distribution of a switching noise) on the first surface of the circuit substrate 20 in the low voltage system side of the three phase inverter device according to the first exemplary embodiment. In more detail, FIG. 17A shows the distribution of the magnetic field strength in the X axis direction. FIG. 17B shows the distribution of the magnetic field strength in the Y axis direction. FIG. 17C shows the distribution of the magnetic field strength in the Z axis direction.

FIG. 17A, FIG. 17B and FIG. 17C shows the distribution of the magnetic field strength of the switching frequency component of 9.96 kHz when the motor generator 80 has a rotation speed of 1000 rpm and the carrier frequency fc of 4.98 kHz.

The range for analyzing the distribution of the magnetic field strength on the circuit substrate 20 is within the area designated by SX and SY shown in FIG. 11.

As shown in FIG. 17A, FIG. 17B and FIG. 17C, when observed from the first surface side of the circuit substrate 200 of the related art, the magnetic field is increased on the parts on which the microcomputer 94, the interface circuit 96, the differential wiring pattern 130, the single wiring pattern 132 and the current wiring pattern 134 are formed. In particular, the magnetic field in the Z axis is drastically increased in these areas on the first surface of the circuit substrate 200 of the related art.

When the switching noise is increased, the resolver error Er is also increased. When the resolver error Er is increased, the switching element S$# often perform an incorrect operation. This changes the output torque of the motor generator 80. Furthermore, the calculation accuracy of the drive signals g$# to be used in the current vector control is decreased when switching noise emitted from the smoothing capacitor 62 is mixed in the output signals iv and iw of the V and W phase current sensors 86*v* and 86*w*. As a result, the output torque of the motor generator 80 is varied due to the decreasing of the calculation accuracy of the drive signals g$#. When the output torque of the motor generator 80 is fluctuated, there is a possibility of decreasing and deteriorating the function of adjusting the output torque of the motor generator 80.

On the other hand, the electric power conversion device according to the first exemplary embodiment has an improved structure of the circuit substrate 20 in order to prevent that the resolver error Er is increased and switching noise is mixed in the output signals iv and iw of the V phase current sensor 86*v* and the W phase current sensor 86*w*.

Figure 18:
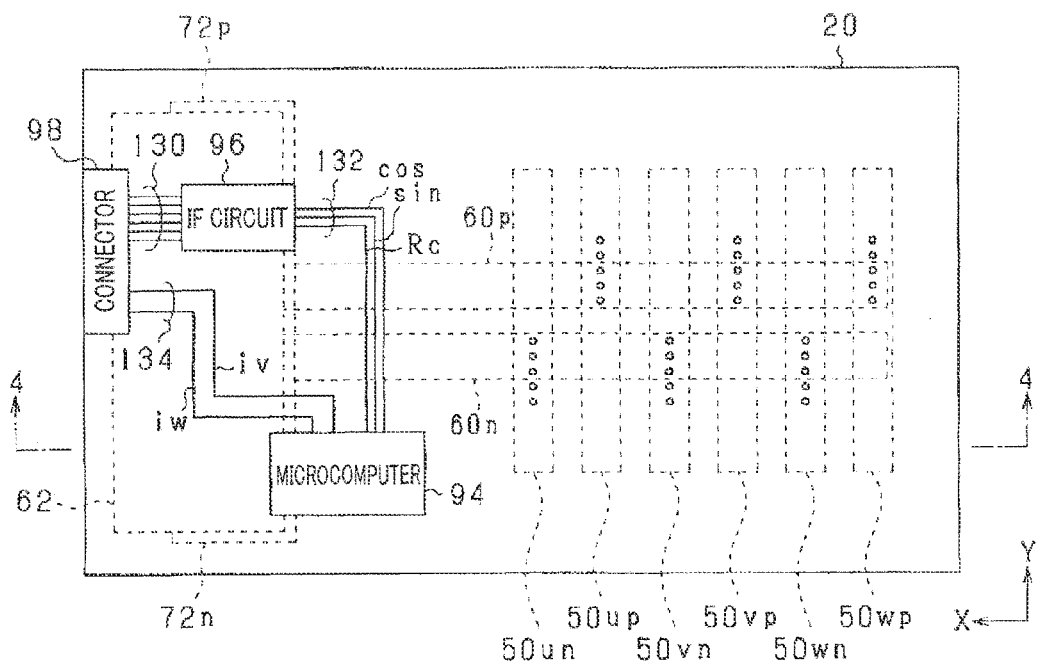
FIG. 18 is a plan view showing the circuit substrate when observed from the second surface of the circuit substrate (as a housing casing side) in the three phase inverter device as the electric power conversion device according to the first exemplary embodiment of the present invention.

FIG. 18 is a plan view showing the circuit substrate 20 when observed from the second surface of the circuit substrate 20 (at the housing casing side) in the three phase inverter device as the electric power conversion device according to the first exemplary embodiment.

The same components shown in FIG. 18 and the various diagrams previously described will be referred to with the same reference numbers and characters.

As shown in FIG. 18, the microcomputer 94, the interface circuit 96, the differential wiring pattern 130, the single wiring pattern 132 and the current wiring pattern 134 are formed on the second surface of the circuit substrate 20. The microcomputer 94, the interface circuit 96, the differential wiring pattern 130, the single wiring pattern 132 and the current wiring pattern 134 is electrically insulated from the smoothing capacitor 62, the positive electrode bus bar 60*p* at the positive electrode side, the positive electrode terminal 72*p* at the positive electrode side, the negative electrode bus bar 60*n* at the negative electrode side and the negative electrode terminal 72*n* at the negative electrode side by a ground pattern formed in the interior layers of the circuit substrate 20.

The drive circuits Dr$# (omitted from FIG. 18) are also formed on the second surface of the circuit substrate 20.

Figure 19:
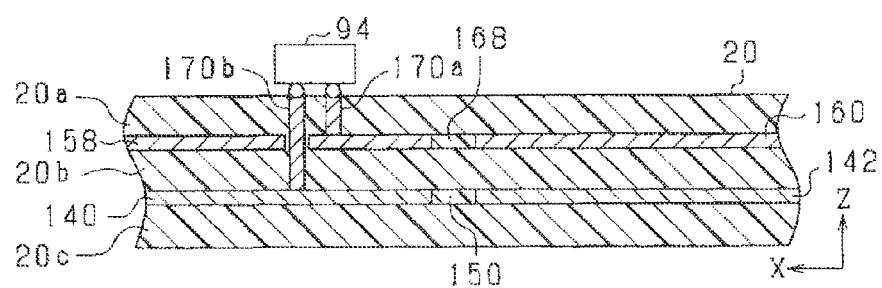
FIG. 19 is a partial cross sectional view of the hosing casing along the line 4-4 shown in FIG. 18.

FIG. 19 is a partial cross sectional view of the housing casing along the line 4-4 shown in FIG. 18. In more detail, FIG. 19 shows a cross section of the area around the microcomputer 94.

As shown in FIG. 19, the circuit substrate 20 has a structure in which a first insulation layer 20*a*, an electric power source pattern layer, a second insulation layer 20*b*, a ground pattern layer and a third insulation layer 20*c* are stacked to form the circuit substrate 20. That is, the circuit substrate 20 has the structure in which the first surface and the second surface form a pair of the outside surface layers, and the electric power source pattern layer and the ground pattern layer are formed between the first surface and the second surface. Each of the first, second and third insulation layers 20*a*, 20*b* and 20*c* is made of an insulator (for example, an insulation resin). FIG. 19 also shows the structure in which the microcomputer 94 is electrically connected to the electric power source pattern through a first via 170*a*. The first via 170*a* is formed in a Z axis direction as a thickness direction of the circuit substrate 20 to penetrate the first insulation layer 20*a*. Still further, FIG. 19 also shows the structure in which the microcomputer 94 is electrically connected to the ground pattern through a second via 170*b* formed in the thickness direction of the circuit substrate 20 to penetrate the first insulation layer 20*a* and the second insulation layer 20*b*.

Figure 20:
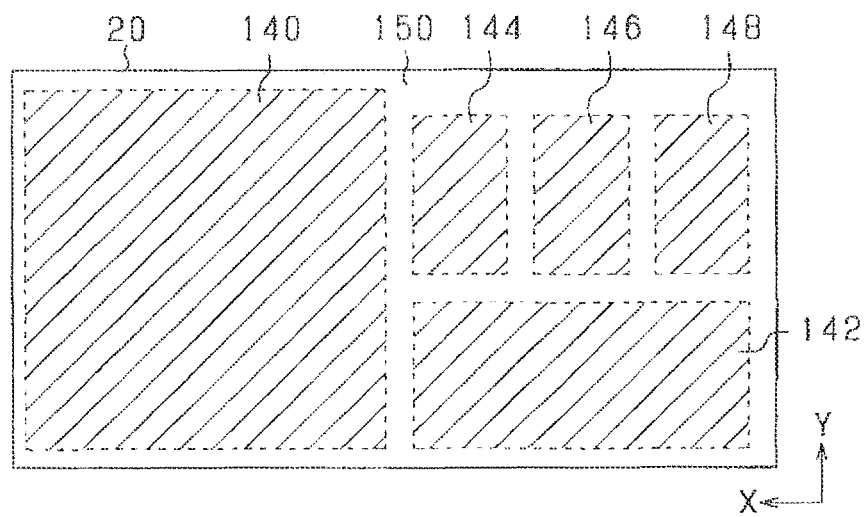
FIG. 20 is a view showing a ground pattern layer formed in the inside of the circuit substrate used in the three phase inverter device as the electric power conversion device according to the first exemplary embodiment of the present invention.

FIG. 20 is a view showing the ground pattern layer formed in the inside of the circuit substrate 20, when observed from the housing casing 64 side, used in the three phase inverter device as the electric power conversion device according to the first exemplary embodiment.

The ground pattern layer is comprised of a ground pattern layer 140 for the low voltage system, a ground pattern 142 corresponding to the switching elements Sun to Swn at the lower arm in the U, V and W phases, a ground pattern 144 corresponding to the switching elements Sup at the upper arm in the U phase, a ground pattern 146 corresponding to the switching elements Svp at the upper arm in the V phase and a ground pattern 148 corresponding to the switching elements Swp at the upper arm in the W phase. These ground patterns 142, 144, 146 and 148 are solid patterns. In particular, when observed from the front side of the circuit substrate 20, the ground pattern 140 for the low voltage system is formed in the circuit substrate 20 to contain the differential wiring pattern 130, the single wiring pattern 132, the current wiring pattern 134, the microcomputer 94 and the interface circuit 96. By the structure of the ground patterns formed in the interior layers of the circuit substrate 20, it is possible for the ground pattern 140 to separate and electrically insulate the microcomputer 94, the interface circuit 96, the differential wiring pattern 130, the single wiring pattern 132 and the current wiring pattern 134 from the smoothing capacitor 62, the positive electrode bus bar 60*p* at the positive electrode side, the negative electrode bus bar 60*n* at the negative electrode side, the positive electrode terminal 72*p* at the positive electrode side and the negative electrode terminal 72*n* at the negative electrode side.

In FIG. 19, reference number 150 indicates the insulation layer with which the adjacent ground patterns are electrically insulated from each other.

Figure 21:
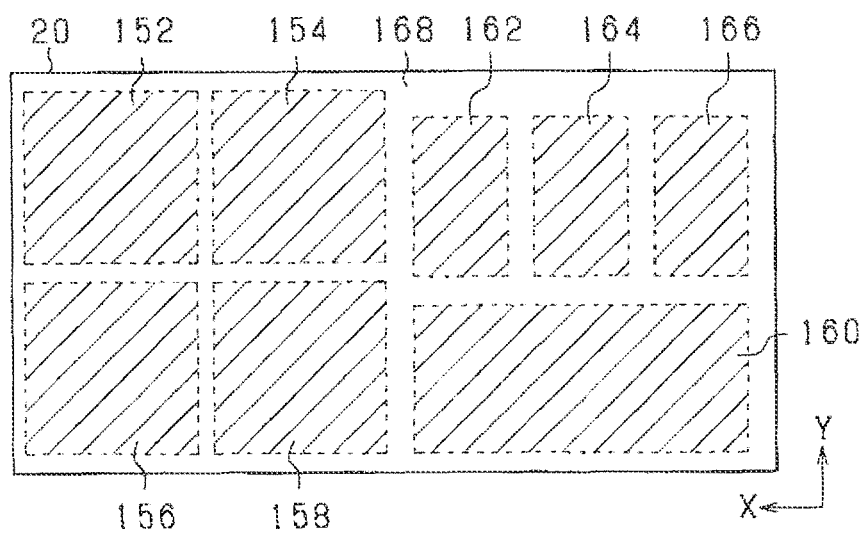
FIG. 21 is a view showing an electric power source pattern layer formed in the inside of the circuit substrate, when observed from the housing casing side, used in the three phase inverter device as the electric power conversion device according to the first exemplary embodiment of the present invention.

FIG. 21 is a view showing a pattern of the electric power source pattern layer formed in the inside of the circuit substrate 20, when observed from the housing casing 64 side, used in the three phase inverter device as the electric power conversion device according to the first exemplary embodiment.

First to fourth electric power source patterns 152, 154, 156 and 158 for the low voltage system are formed in the electric power source pattern layer. Each of the first to fourth electric power source patterns 152, 154, 156 and 158 supplies a different voltage.

An electric power source pattern 160, an electric power source pattern 162, an electric power source pattern 164 and an electric power source pattern 166 are formed in the electric power pattern layer.

That is, the electric power source pattern 160 corresponds to the switching elements Sun to Swn in the lower arm of the U phase, the V phase and the W phase. The electric power source pattern 162 corresponds to the switching element Sup in the upper arm of the U phase. The electric power source pattern 164 corresponds to the switching element Svp in the upper arm of the V phase. The electric power source pattern 166 corresponds to the switching element Swp in the upper arm of the W phase. These electric power source patterns are solid patterns. The insulation layer for electrically insulating the adjacent electric power source patterns 162, 164 and 166 are designated with reference number 168 in FIG. 21.

As shown in FIG. 18, the differential wiring pattern 130, the single wiring pattern 132 and the current wiring pattern 134 are formed on the second surface of the circuit substrate 20 in order to overlap them with the current flow path (as a closed circuit). The current flow path is formed by the smoothing capacitor 62, the positive electrode bus bar 60p, the positive electrode terminal 72p, the negative electrode bus bar 60n and the negative electrode terminal 72n. This structure makes it possible to suppress the influence of noise on the signals transmitted through the differential wiring pattern 130, the single wiring pattern 132 and the current wiring pattern 134.

Figure 22:
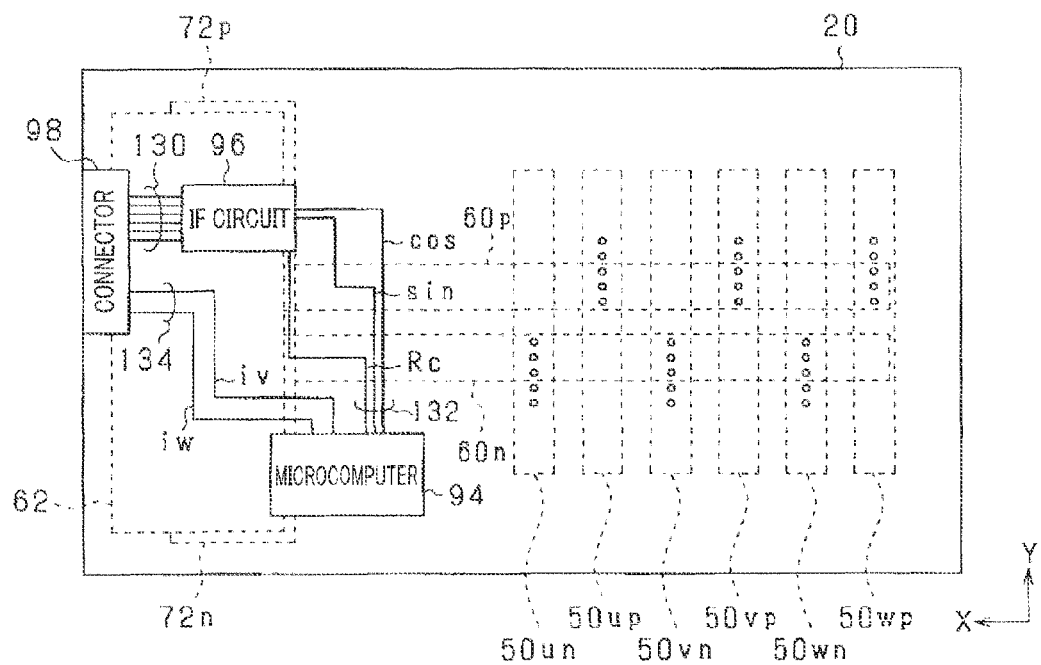
FIG. 22 is a view showing a pattern of a power source on a circuit substrate used by a comparison example.

FIG. 22 is a view showing a pattern of a power source on a circuit substrate used by a comparison example according to a related art. The pattern of the related art shown in FIG. 22 only has a small effect to prevent the influence of the switching noise on transmitted signals. That is, because a partial area in the pattern, through which the modulated wave sin is transmitted, runs overlapped with the bus bar 60p in the positive electrode side, and the magnitude of switching noise mixed in the modulated signal sin is increased in the structure of the related art shown in FIG. 22. Furthermore, the magnitude of switching noise mixed in the excitation signal Sc and the single end signal RC is also increased.

A description will now be given of the effects of the three phase inverter device as the electric power conversion device according to the first exemplary embodiment.

(1) The three phase inverter device as the electric power conversion device according to the first exemplary embodiment has the improved structure in which the microcomputer 94, the interface circuit 96, the differential wiring pattern 130, the single wiring pattern 132 and the current wiring pattern 134 are formed in the second surface of the circuit substrate 20. The ground pattern 140 is formed as the interior layer in the circuit substrate 20 in order to separate the microcomputer 94, the interface circuit 96, the differential wiring pattern 130, the single wiring pattern 132 and the current wiring pattern 134 from the smoothing capacitor 62, the positive electrode bus bar 60p, the negative electrode bus bar 60n, the positive electrode terminal 72p and the negative electrode terminal 72n. That is, the presence of the ground pattern 140 can decrease the propagation of switching noise on the second surface of the circuit substrate 20 from the noise generation source such as the positive electrode bus bar 60p, the positive electrode terminal 72p, the negative electrode bus bar 60n, the negative electrode terminal 72n, the smoothing capacitor 62, etc.

This structure of the first exemplary embodiment makes it possible to avoid occurrence of incorrect operation of the components and devices such as the switching elements S$# formed in the circuit substrate 20. It is accordingly possible to prevent the function of the torque control to the motor generator 80 from being deteriorated.

Further, the ground pattern 140 is usually formed as an interior layer in the circuit substrate 20. It is therefore possible to use the ground pattern 140 to reduce switching noise which are propagated to the second surface side of the circuit substrate 20. This makes it possible to prevent the size of the three phase inverter device 10 as the electric power conversion device and the manufacturing cost from being increased.

(2) In the structure of the three phase inverter device as the electric power conversion device according to the first exemplary embodiment, the differential wiring pattern 130, the single wiring pattern 132 and the current wiring pattern 134 are formed in the second surface of the circuit substrate 20, when observed from the front surface side of the circuit substrate 20, so that these patterns 130, 132 and 134 are not overlapped with the current flow path which contains the smoothing capacitor 62, the positive electrode bus bar 60p, the positive electrode terminal 72p, the negative electrode bus bar 60n and the negative electrode terminal 72n. This structure makes it possible to suppress influence of switching noise on the signals transmitted through the differential wiring pattern 130, the single wiring pattern 132 and the current wiring pattern 134. It is therefore possible to avoid the deterioration of the function of the torque control to the motor generator 80.

Second Exemplary Embodiment

A description will be given of the three phase inverter device as the electric power conversion device according to a second exemplary embodiment with reference to FIG. 23 and FIG. 24.

Figure 23:
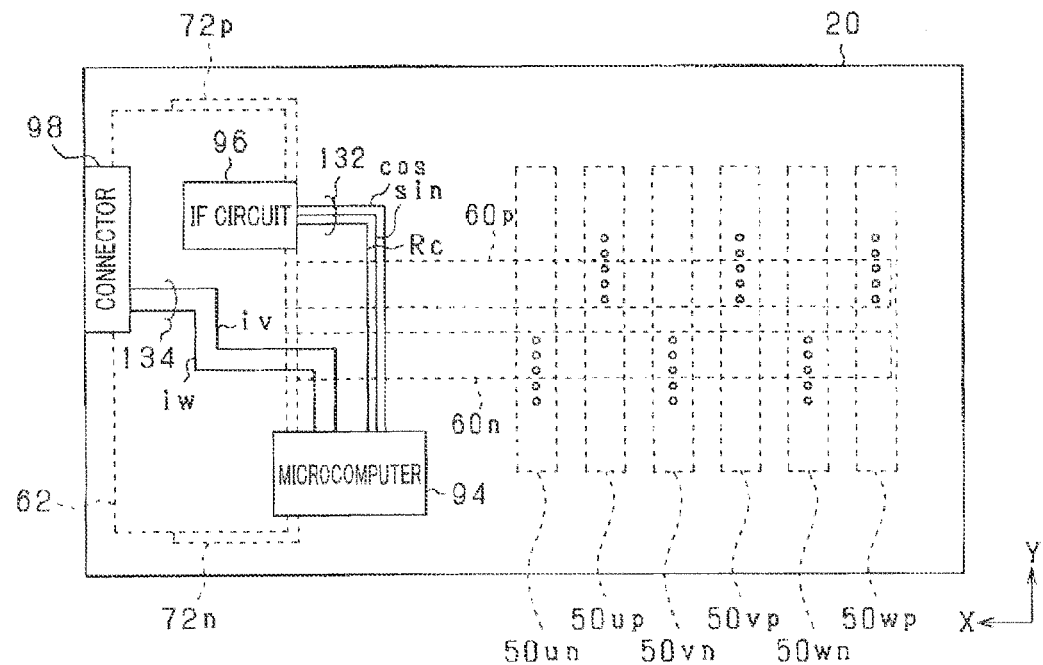
FIG. 23 is a plan view showing a circuit substrate, when observed from the second surface side (at the smoothing capacitor side), used in the three phase inverter device according to a second exemplary embodiment of the present invention.

FIG. 23 is a plan view showing the circuit substrate 20, when observed from the second surface side (at the smoothing capacitor 62 side), used in the three phase inverter device according to the second exemplary embodiment. FIG. 24 is a plan view showing the circuit substrate 20-1, when observed from the first surface side, used in the three phase inverter device according to the second exemplary embodiment.

Figure 24:
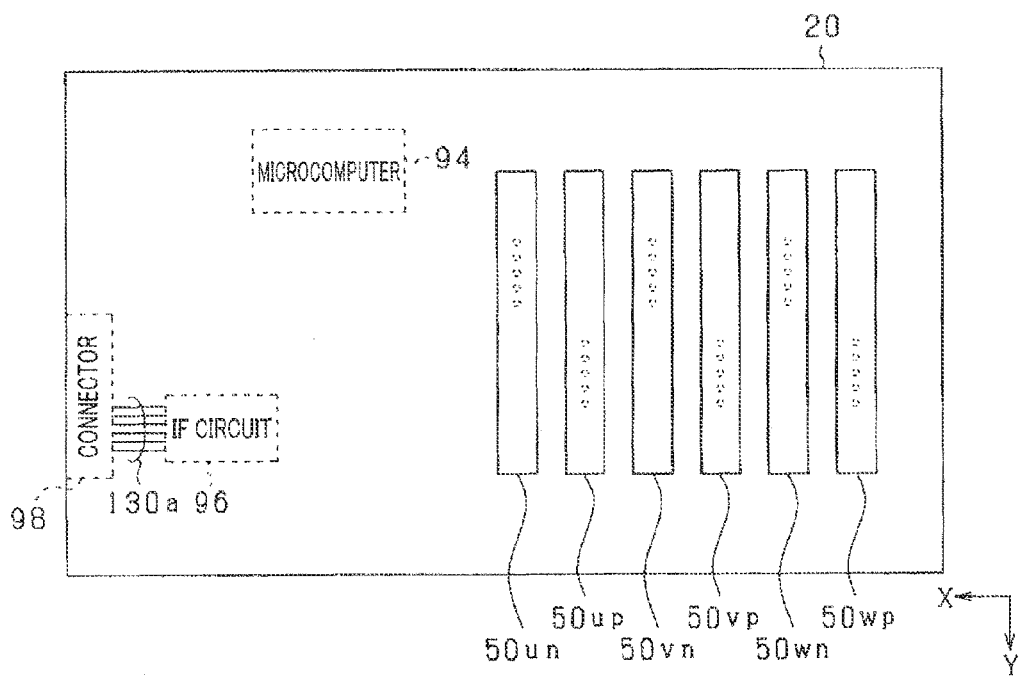
FIG. 24 is a plan view showing the circuit substrate, when observed from the first surface side, used in the three phase inverter device as the electric power conversion device according to the second exemplary embodiment of the present invention.

As shown in FIG. 23 and FIG. 24, a differential wiring pattern 130a (made of copper foil, for example) is formed in the first surface of the circuit substrate 20. FIG. 23 is a plan view showing the circuit substrate 20 when observed from the second surface side (the housing casing 64 side). On the other hand, FIG. 24 is a plan view showing the circuit substrate 20 when observed from the first surface side. The same components between the second exemplary embodiment and the first exemplary embodiment will be referred to with the same reference numbers and characters for brevity.

The reason why the differential wiring pattern 130a can be formed in the first surface of the circuit substrate 20 according to the second exemplary embodiment is as follows.

For example, when switching noise is mixed in the excitation signal Sc as the differential signal, the switching noise is also mixed in the signals transmitted through the electrical paths connected to an inverse input terminal and a non-inverse input terminal of the operational amplifier forming the first differential amplification circuit 96c. Accordingly, the magnitude of influence of the switching noise on the voltage potential between these electric paths becomes small. This means that the magnitude of influence of the switching noise on the single end signal RC outputted from the first differential amplification circuit 96c becomes small. As a result, the structure, in which the differential wiring pattern 130a to transmit differential signals is formed on the first surface of the circuit substrate 20, reduces the influence of switching noise on the calculation accuracy of the electrical angle θ.

As previously described, it is possible for the structure of the circuit substrate 20 shown in FIG. 24 according to the second exemplary embodiment to release the limitation of the arrangement on the first surface and the second surface of the circuit substrate 20.

Third Exemplary Embodiment

A description will be given of the three phase inverter device 10 as the electric power conversion device according to a third exemplary embodiment with reference to FIG. 25, FIG. 26 and FIG. 27.

The three phase inverter circuit 10 according to the third exemplary embodiment has two sub-smoothing capacitors, i.e. a first smoothing capacitor 63a and a second smoothing capacitor 63b.

A description will now be given of the overall structure of the three phase inverter device 10 according to the third exemplary embodiment with reference to FIG. 25, FIG. 26 and FIG. 27.

The same components between the third exemplary embodiment and the first and second exemplary embodiments will be referred to with the same reference numbers and characters for brevity.

Figure 25:
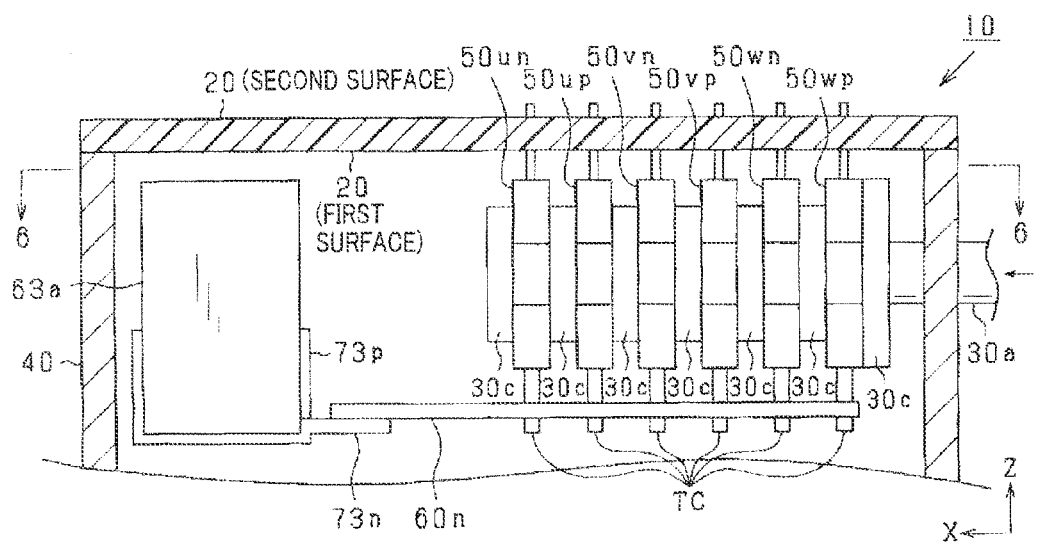
FIG. 25 is a cross sectional view of the three phase inverter device along the line 5-5 shown in FIG. 26 according to a third exemplary embodiment of the present invention.
Figure 26:
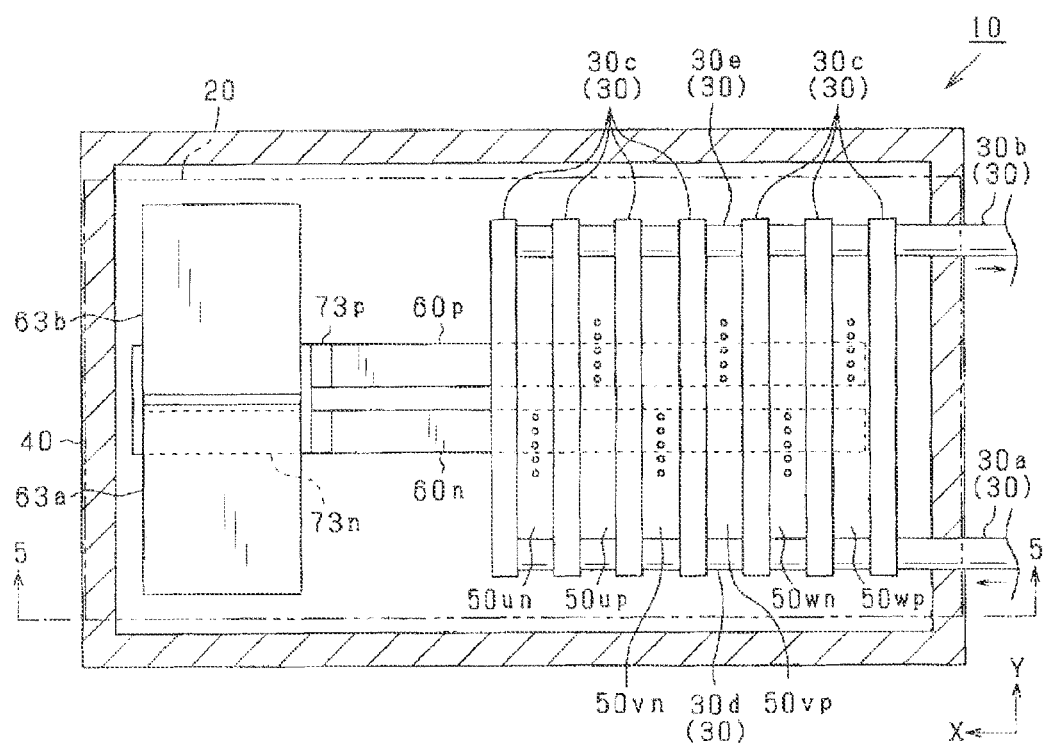
FIG. 26 is a cross sectional view of the three phase inverter device along the line 6-6 shown in FIG. 25.
Figure 27:
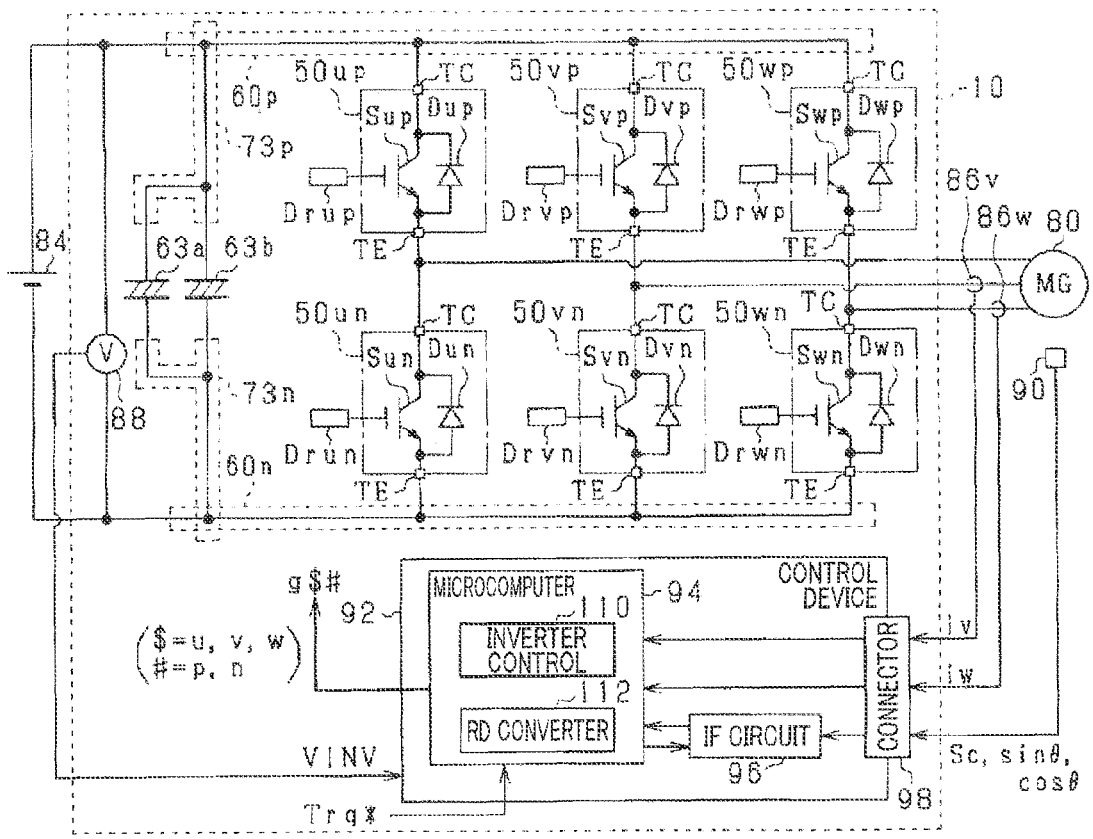
FIG. 27 is a view showing a whole structure of a motor control system having the three phase inverter device according to the third exemplary embodiment of the present invention.

FIG. 25 is a cross sectional view of the three phase inverter device 10 according to the third exemplary embodiment, along the line 5-5 shown in FIG. 26. FIG. 26 is a cross sectional view of the three phase inverter device 10 along the line 6-6 shown in FIG. 25. FIG. 27 is a view showing a whole structure of the motor control system having the three phase inverter device 10 according to the third exemplary embodiment.

As shown in FIG. 26, the three phase inverter device 10 has the first smoothing capacitor 63a and the second smoothing capacitor 63b. For example, the first smoothing capacitor 63a has a capacitance which is half of the smoothing capacitor 62 used in the first exemplary embodiment. Similarly, the second smoothing capacitor 63b has a capacitance which is half of the smoothing capacitor 62 used in the first exemplary embodiment.

The bus bar 60p at the positive electrode side is connected to the positive electrode terminal of each of the first smoothing capacitor 63a and the second smoothing capacitor 63b through a positive electrode terminal 73p. The bus bar 60n at the negative electrode side is connected to the negative electrode terminal of each of the first smoothing capacitor 63a and the second smoothing capacitor 63b through a negative electrode terminal 73n.

In the structure as previously described, the three phase inverter circuit according to the third exemplary embodiment has a series connection unit comprised of the first smoothing capacitor 63a and the second smoothing capacitor 63b connected in parallel. This structure makes it possible to decrease a current flowing in each of the first smoothing capacitor 63a and the second smoothing capacitor 63b when compared with a current flowing in the smoothing capacitor 63 used in the first exemplary embodiment. Further, because the structure composed of the first smoothing capacitor 63a and the second smoothing capacitor 63b can decrease an area of a current loop as a closed circuit containing the first smoothing capacitor 63a and the second smoothing capacitor 63b, it is possible to separate noise generation sources to each other. That is, this structure makes it possible to reduce the switching noise emitted from the current loop which contains first smoothing capacitor 63a and the second smoothing capacitor 63b. Further, this structure makes it possible to suppress influence of the switching noise on the torque control of the motor generator 80.

Other Modifications

It is possible to modify the structure of each of the three phase inverter device as the electric power conversion device according to the first to third exemplary embodiment on the basis of the concept of the present invention.

The concept of the present invention is not limited by the solid pattern of the circuit substrate 20 shown in FIG. 20 in which the solid pattern is formed to separate the microcomputer 94, the interface circuit 96, the differential wiring pattern 130, the single wiring pattern 132 and the current wiring pattern 134 from the smoothing capacitor 62, the positive electrode bus bar 60p at the positive electrode side, the positive electrode terminal 72p at the positive electrode side, the negative electrode bus bar 60n at the negative electrode side and the negative electrode terminal 72n at the negative electrode side. It is possible to use the current source pattern formed in the circuit substrate 20 for separating the microcomputer 94, etc. from the smoothing capacitor 62, etc.

It is possible to arrange one of the electronic components and the wiring patterns on the second surface of the circuit substrate having the multi-layer structure. The modified structure makes it possible to suppress occurrence of incorrect operation of the electronic components in the circuit substrate.

The first, second and third exemplary embodiments use the interface circuit 96 as the analogue IC capable of generating the drive signals g$# to be used for the control of the switching elements S$#. The concept of the present invention is not limited by this. It is possible to use another analogue IC, for example, a comparator capable of forcedly turning off the switching elements S$# when an excess current flows in the switching elements S$#.

It is possible for the three phase inverter device according to the third exemplary embodiment to use not less than three smoothing capacitors.

In the structure of the three phase inverter device according to the first exemplary embodiment, it is possible to set a value of 1 to the detection signal Rd when the reference signal REF is more than zero, and set a value of −1 to the detection signal Rd when the reference signal REF is not more than zero. In addition, in order to detect the modulated wave, it is possible to use a method of directly multiplying the reference signal REF and the control error ε instead of the method using the detection signal Rd.

It is possible for the three phase inverter device as the electric power conversion device according to the present invention to use a value $\sin(\theta+\phi)$ which is obtained by adding the output value of the cosine function multiplier unit 112a and the output value of the sine function multiplier unit 112b. In this case, because the calculated angle $\phi$ is a negative value, it is possible to use a value obtained by inverting a sign of the calculated angle $\phi$, and obtain an actual electrical angle $\theta$ on the basis of the calculated angle $\phi$ with the inverted sign.

It is also possible to use a sampling period which is not in synchronization with the period obtained by dividing the period of the excitation signal by N (N is an integer of not less than 2) instead of the sampling period in synchronization with the period obtained by dividing the period of the excitation signal by N.

The three phase inverter device as the electric power conversion device according to the present invention uses the DC power source. However, the concept of the present invention is not limited by this. It is possible to use an alternating current (AC) power source and a full-wave rectifier capable of converting an AC voltage of the AC power source to a DC voltage.

The three phase inverter device as the electric power conversion device according to the present invention uses an IPMSM (Interior Permanent Magnet Synchronous Motor). However, the concept of the present invention is not limited by this. It is possible to use other synchronous motors such as an SPMSM (Surface Permanent Magnet Synchronous Motor). It is also possible to use an induction motor instead of a synchronous motor.

It is also possible to use a MOS FET as a switching element instead of an IGBT.

The three phase inverter device as the electric power conversion device according to the present invention uses a three phase inverter device. However, the concept of the present invention is not limited by this. It is possible to use a half-bridge inverter device and a full bridge inverter device instead of using the three phase inverter device.

Furthermore, it is possible to use another type of the electric power conversion device such as a DC-DC converter, for example. It is possible to apply the concept of the present invention to another type of the electric power conversion device so long as the smoothing capacitor is arranged at a position which faces a surface of the circuit substrate in the electric power conversion device.

While specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention which is to be given the full breadth of the following claims and all equivalents thereof.

What is claimed is:

1. An electric power conversion device comprising:
a plurality of switching elements;
a control circuit configured to output drive signals to the switching elements to turn on and off the switching elements;
a multi-layer substrate comprising a first surface and a second surface and interior layers, and solid pattern being formed in the interior layers; and
a smoothing capacitor connected to the switching elements through conductive members, and performing an operation of smoothing a direct current voltage to be supplied to the switching elements, wherein:
the conductive members are formed in the multi-layer substrate at the first surface side of the multi-layer substrate,
the smoothing capacitor is formed in an area corresponding to the first surface side,
at least one of electronic components is formed on the second surface of the multi-layer substrate, which contains the control circuit and wiring patterns connected to the electronic components, on which drive signals to be used for driving the switching elements are transmitted,
the solid pattern is formed in the interior layers of the multi-layer substrate to separate the electronic components and the wiring patterns which are formed on the second surface of the multi-layer substrate from the smoothing capacitor and the conductive members,
the control circuit comprises a microcomputer capable of generating the drive signals and outputting the generated drive signals to the switching elements, and
the electronic components comprises the control circuit and an analogue integrated circuit for performing the operation of the switching elements,
the electric power conversion device is an inverter device for converting a direct current voltage outputted from a direct current power source to an alternating current voltage by turning on and off the switching elements, and outputting the alternating current voltage to an electric rotary machine,
the electronic components and the wiring patterns are formed on the second surface of the multi-layer substrate,
the solid pattern is formed in the multi-layer substrate to separate the electronic components and the wiring patterns from the smoothing capacitor and the conductive members,
at least one of a detection signal from a resolver for detecting a rotary angle of the electric rotary machine and a detection signal from a current sensor for detecting a current flowing in the electric rotary machine is transmitted to the microcomputer through the wiring patterns, and
the microcomputer generates the drive signals on the basis of the received detection signal from the resolver and the received detection signal from the current sensor,
the analogue integrated circuit comprises differential amplifier circuits for converting a differential signal of the detection signal outputted from the resolver to a single end signal, and
the wiring patterns comprises:
a first wiring pattern through which the single end signal outputted from the differential amplifier circuit to the microcomputer;
a second wiring pattern through which a differential signal of the detection signal outputted from the resolver is transmitted to the differential amplifier circuit,
the second wiring pattern is formed on the first surface of the multi-layer substrate, and
the first wiring pattern is formed on the second surface of the multi-layer substrate.

2. The electric power conversion device according to claim 1, wherein the electronic components and the wiring patterns are formed on the second surface of the multi-layer substrate, and the solid pattern is formed in the interior layers of the multi-layer substrate to separate the electronic components and the wiring patterns from the smoothing capacitor and the conductive members.

3. The electric power conversion device according to claim 2, wherein the control circuit comprises a microcomputer capable of generating the drive signals and outputting the generated drive signals to the switching elements, and
the electronic components comprises the control circuit and an analogue integrated circuit for performing the operation of the switching elements.

4. The electric power conversion device according to claim 3, wherein the electric power conversion device is an inverter device for converting a direct current voltage outputted from a direct current power source to an alternating current voltage by turning on and off the switching elements, and outputting the alternating current voltage to an electric rotary machine,
the electronic components and the wiring patterns are formed on the second surface of the multi-layer substrate,
the solid pattern is formed in the multi-layer substrate to separate the electronic components and the wiring patterns from the smoothing capacitor and the conductive members,
at least one of a detection signal from a resolver for detecting a rotary angle of the electric rotary machine and a detection signal from a current sensor for detecting a current flowing in the electric rotary machine is transmitted to the microcomputer through the wiring patterns, and
the microcomputer generates the drive signals on the basis of the received detection signal from the resolver and the received detection signal from the current sensor.

5. An electric power conversion device comprising:
a plurality of switching elements;
a control circuit configured to output drive signals to the switching elements to turn on and off the switching elements;
a multi-layer substrate comprising a first surface and a second surface and interior layers, and solid pattern being formed in the interior layers; and a smoothing capacitor connected to the switching elements through conductive members, and performing an operation of smoothing a direct current voltage to be supplied to the switching elements, wherein:

the conductive members are formed in the multi-layer substrate at the first surface side of the multi-layer substrate, the smoothing capacitor is formed in an area corresponding to the first surface side, at least one of electronic components is formed on the second surface of the multi-layer substrate, which contains the control circuit and wiring patterns connected to the electronic components, on which drive signals to be used for driving the switching elements are transmitted, the solid pattern is formed in the interior layers of the multi-layer substrate to separate the electronic components and the wiring patterns which are formed on the second surface of the multi-layer substrate from the smoothing capacitor and the conductive members, the electronic components and the wiring patterns are formed on the second surface of the multi-layer substrate, and the solid pattern is formed in the interior layers of the multi-layer substrate to separate the electronic components and the wiring patterns from the smoothing capacitor and the conductive members, the control circuit comprises a microcomputer capable of generating the drive signals and outputting the generated drive signals to the switching elements, and the electronic components comprises the control circuit and an analogue integrated circuit for performing the operation of the switching elements, the electric power conversion device is an inverter device for converting a direct current voltage outputted from a direct current power source to an alternating current voltage by turning on and off the switching elements, and outputting the alternating current voltage to an electric rotary machine, the electronic components and the wiring patterns are formed on the second surface of the multi-layer substrate, the solid pattern is formed in the multi-layer substrate to separate the electronic components and the wiring patterns from the smoothing capacitor and the conductive members, at least one of a detection signal from a resolver for detecting a rotary angle of the electric rotary machine and a detection signal from a current sensor for detecting a current flowing in the electric rotary machine is transmitted to the microcomputer through the wiring patterns, the microcomputer generates the drive signals on the basis of the received detection signal from the resolver and the received detection signal from the current sensor, the analogue integrated circuit comprises differential amplifier circuits for converting a differential signal of the detection signal outputted from the resolver to a single end signal, and the wiring patterns comprises:
  a first wiring pattern through which the single end signal outputted from the differential amplifier circuit to the microcomputer; and
  a second wiring pattern through which a differential signal of the detection signal outputted from the resolver is transmitted to the differential amplifier circuit,
  the second wiring pattern is formed on the first surface of the multi-layer substrate, and
  the first wiring pattern is formed on the second surface of the multi-layer substrate.

6. The electric power conversion device according to claim 1, wherein the wiring pattern is formed on the second surface of the multi-layer substrate so that the wiring pattern does not run over a current flow path which contains the smoothing capacitor and the conductive members when observed from the front view side of the multi-layer substrate.

7. The electric power conversion device according to claim 2, wherein the wiring pattern is formed on the second surface of the multi-layer substrate so that the wiring pattern does not run over a current flow path which contains the smoothing capacitor and the conductive members when observed from the front view side of the multi-layer substrate.

8. The electric power conversion device according to claim 1, wherein the smoothing capacitor comprises a plurality of sub-smoothing capacitors connected in parallel and connected to the switching elements through the conductive members.

9. The electric power conversion device according to claim 2, wherein the smoothing capacitor comprises a plurality of sub-smoothing capacitors connected in parallel and connected to the switching elements through the conductive members.

* * * * *